United States Patent
Tomita et al.

(10) Patent No.: US 9,602,008 B1
(45) Date of Patent: Mar. 21, 2017

(54) POWER CONVERSION APPARATUS AND METHOD FOR CONTROLLING POWER CONVERSION APPARATUS

(71) Applicant: DENSO CORPORATION, Kariya, Aichi-pref. (JP)

(72) Inventors: Kenji Tomita, Nukata-gun (JP); Kimikazu Nakamura, Handa (JP); Shinya Goto, Gifu (JP); Katsutoyo Misawa, Kariya (JP); Yuuichi Handa, Anjo (JP); Seiji Iyasu, Anjo (JP)

(73) Assignee: DENSO CORPORATION, Kariya (JP)

( * ) Notice: Subject to any disclaimer, the term of this patent is extended or adjusted under 35 U.S.C. 154(b) by 14 days.

(21) Appl. No.: 14/857,023

(22) Filed: Sep. 17, 2015

(51) Int. Cl.
*H02M 3/335* (2006.01)

(52) U.S. Cl.
CPC .............................. *H02M 3/33507* (2013.01)

(58) Field of Classification Search
CPC ......... H02M 3/33507; H02M 3/33523; H02M 3/33561; H02M 3/33569; H02M 2001/0032; Y02B 70/1475
USPC .............................................. 363/21.1–21.18
See application file for complete search history.

(56) References Cited

U.S. PATENT DOCUMENTS

| | | | | |
|---|---|---|---|---|
| 4,471,418 A | * | 9/1984 | Tuma ................ | H02M 3/33507 323/285 |
| 6,809,494 B1 | * | 10/2004 | Hattori ...................... | H02P 5/46 318/249 |
| 2009/0108674 A1 | * | 4/2009 | Ozaki ................... | B60L 3/0046 307/10.6 |

FOREIGN PATENT DOCUMENTS

| JP | H05-33611 A | 2/1993 |
|---|---|---|
| JP | 2007-295699 A | 11/2007 |

* cited by examiner

*Primary Examiner* — Yemane Mehari
(74) *Attorney, Agent, or Firm* — Oliff PLC

(57) ABSTRACT

A power conversion apparatus supplies power from a DC power supply to a capacitive load by a current input push-pull DCDC converter provided with switching elements Q1 and Q2. When a capacitive load voltage is not larger than a second predetermined value, a first mode is used which turns ON one of the switching elements Q1 and Q2 alternated with turning OFF both. When the capacitive load voltage is larger than the second predetermined value but not larger than a first predetermined value, a second mode is used which turns ON both of the switching elements Q1 and Q2, then turns ON one of them, then turns OFF both, sequentially. When the capacitive load voltage is larger than the first predetermined value, a third mode is used, turning ON both of the switching elements Q1 and Q2 alternated with turning ON one of them.

96 Claims, 13 Drawing Sheets

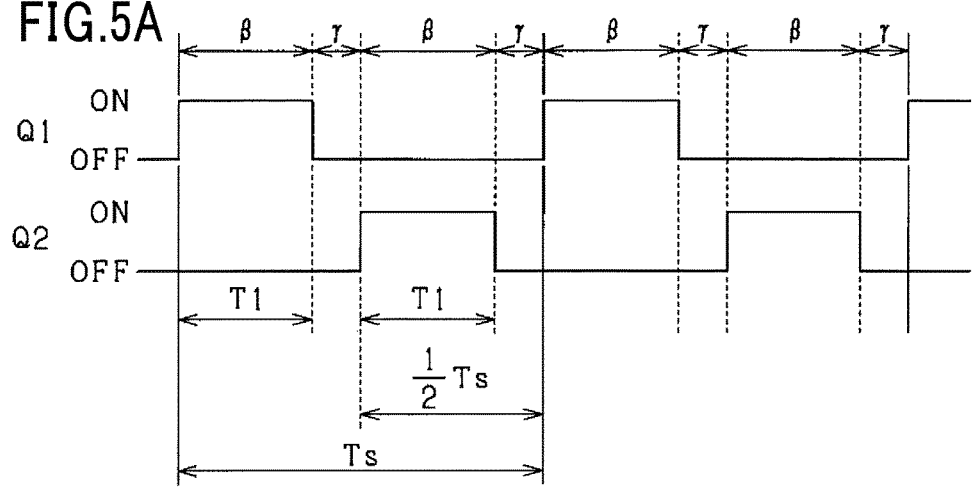
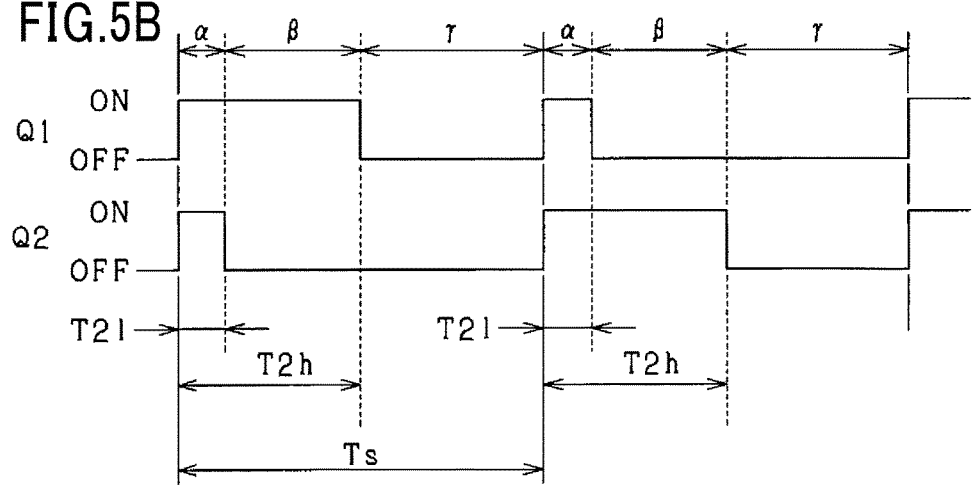
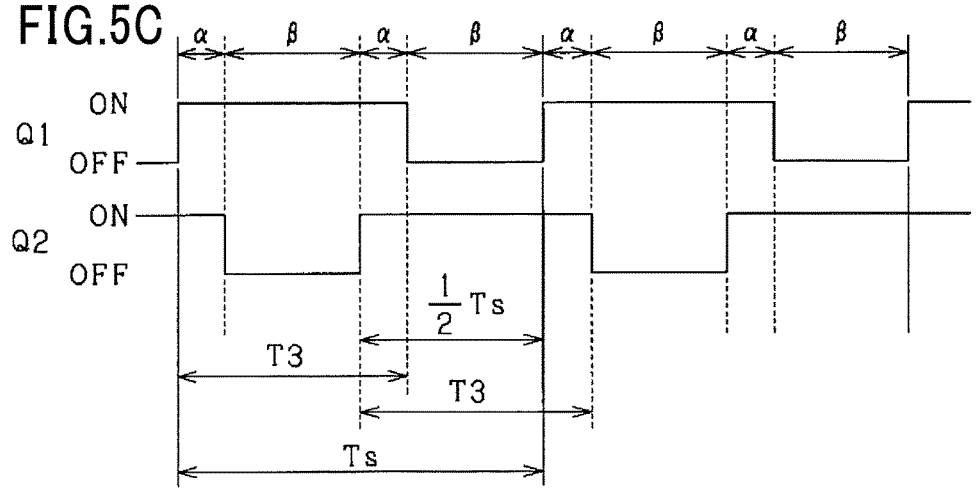

POWER CONVERSION APPARATUS AND METHOD FOR CONTROLLING POWER CONVERSION APPARATUS

BACKGROUND

Technical Field

The present disclosure relates to a power conversion technique for charging a capacitive load.

Background Art

PTL 1 describes a power supply control apparatus that charges a capacitive load using a direct current power supply. The power supply control apparatus described in PTL 1 is provided with a main storage device, a capacitive load connected between power lines of the main storage device, and an auxiliary storage device disposed between the power lines of the main storage device and connected parallel to the capacitive load via a bidirectional converter. Power supply/reception between the main storage device and the auxiliary storage device is performed using the bidirectional converter. The power supply control apparatus described in PTL 1 supplies power of the auxiliary storage device to the capacitive load using the bidirectional converter, thereby charging the capacitive load until the voltage thereof becomes equal to the voltage of the main storage device.

CITATION LIST

Patent Literature

PTL 1: JP-A-2007-295699

In the power supply control apparatus described in PTL 1, when the bidirectional converter is a current input push-pull DCDC converter provided with a choke coil on the auxiliary battery side, the capacitive load is charged by repeatedly increasing and decreasing the current passing through the choke coil. Taking account of reducing cost and size of the system, the power supply control apparatus described in PTL 1 is not provided with a limiting resistor or the like to prevent inrush current.

A necessary condition for decreasing the current passing through the choke coil is that the value of the voltage of the auxiliary battery is smaller than a value obtained by dividing the voltage of the capacitive load by a turn ratio of the coils constituting the bidirectional converter. Accordingly, when the voltage of the capacitive load is small, such as when charging is started, the current passing through the choke coil continues increasing, which may lead to degradation or breakage of the DCDC converter.

SUMMARY

The present disclosure has been made to provide a power conversion technique with which excessive current in a circuit is minimized, while a capacitive load is promptly charged.

A power conversion apparatus of the present disclosure includes: a direct current power supply; and a choke coil having an input terminal connected to a positive terminal of the direct current power supply. In addition, the power conversion apparatus includes:

a first coil having a center tap, with both ends connected to a predetermined connecting point, one end via a first switching element and the other end via a second switching element; a second coil magnetically coupled to the first coil; and a capacitive load connected to the second coil via a rectifying circuit. In addition, the power conversion apparatus includes: a capacitive load voltage detecting means detecting a capacitive load voltage that is a voltage of the capacitive load; and a pulse generation unit transmitting a first PWM signal and a second PWM signal having an equal control cycle and serving as driving signals for the switching elements, the first PWM signal being transmitted to the first switching element, the second PWM signal being transmitted to the second switching element. In the power conversion apparatus of the present disclosure, the center tap is connected to a negative terminal of the power supply and the predetermined connecting point is connected to an output terminal of the choke coil. Alternatively, in the power conversion apparatus, the center tap is connected to an output terminal of the choke coil and the predetermined connecting point is connected to a negative terminal of the power supply. In the power conversion apparatus, when the capacitive load voltage is not larger than a first predetermined value, the following control is defined as a first mode. A phase difference between the first and second PWM signals corresponds to a half of the control cycle, and Duty values of the first and second PWM signals are an equal in value and less than 0.5. When the capacitive load voltage is larger than the first predetermined value, the following control is defined as a third mode. A phase difference between the first and second PWM signals corresponds to a half of the control cycle and Duty values of the first and second PWM signals are an equal in value and more than 0.5.

The power conversion apparatus of the present disclosure includes: a direct current power supply; and a choke coil having an input terminal connected to a positive terminal of the direct current power supply. In addition, the power conversion apparatus includes: a first coil having a center tap, with both ends connected to a predetermined connecting point, one end via a first switching element and the other end via a second switching element; a second coil magnetically coupled to the first coil; and a capacitive load connected to the second coil via a rectifying circuit. In addition, the power conversion apparatus includes: a capacitive load voltage detecting means detecting a capacitive load voltage that is a voltage of the capacitive load; and a pulse generation unit transmitting one of an ON signal for instructing state transition to ON, and an OFF signal for instructing state transition to OFF, to the first and second switching elements. In the power conversion apparatus of the present disclosure, the center tap is connected to a negative terminal of the direct current power supply and the predetermined connecting point is connected to an output terminal of the choke coil. Alternatively, in the power conversion apparatus, the center tap is connected to an output terminal of the choke coil and the predetermined connecting point is connected to a negative terminal of the direct current power supply. In the power conversion apparatus, when the capacitive load voltage is not larger than a first predetermined value, the following control is defined as a first mode. In the first mode, a control of turning ON one of the first and second switching elements and turning OFF the other switching element is alternated with a control of turning OFF both of the first and second switching elements. In the power conversion apparatus, when the capacitive load voltage is larger than the first predetermined value, the following control is defined as a third mode. In the third mode, a control of turning ON one of the first and second switching elements and turning OFF the other switching element is alternated with a control of turning ON both of the first and second switching elements.

In a current input push-pull DCDC converter having a choke coil on the power supply side relative to a transformer, when both the first and second switching elements are in an ON-state, the first coil is in a short-circuited state. Therefore, the voltage of the first coil is zero. Accordingly, the input voltage that is the voltage of the direct current power supply is applied, as it is, to the choke coil, thereby increasing current in a linear manner.

When either one of the first and second switching elements is in an ON-state, increase or decrease of current passing through the choke coil depends on the input voltage, the capacitive load voltage that is the voltage of the capacitive load, and a turn ratio of the coils. That is, when the value of the input voltage is larger than a value obtained by dividing the capacitive load voltage by the turn ratio, the voltage applied to the choke coil has a positive value and the current passing through the choke coil increases. In contrast, when the value of the input voltage is smaller than a value obtained by dividing the capacitive load voltage by the turn ratio, the voltage applied to the choke coil has a negative value and the current passing through the choke coil decreases.

Further, when both the first and second switching elements are in an OFF-state, the current passing through the choke coil decreases.

When the capacitive load voltage is low, such as when charge of the capacitive load is started, the value of the input voltage will be smaller than the value obtained by dividing the capacitive load voltage by the turn ratio. Therefore, if either one of the first and second switching elements is turned ON, the current passing through the choke coil keeps increasing. Accordingly, when the capacitive load voltage is not larger than a first predetermined value, a control is performed using the first mode, under which a phase difference between the first and second PWM signals corresponds to a half of the control cycle, while Duty values of the first and second PWM signals are an equal in value and less than 0.5.

Alternatively, when the capacitive load voltage is not larger than the first predetermined value, a control is performed using the first mode, under which a control of turning ON one of the first and second switching elements and turning OFF the other switching element is alternated with a control of turning OFF both of the first and second switching elements.

In the power conversion apparatus of the present disclosure, under the control of the first mode, a state where one of the first and second switching elements is turned ON is alternated with a state where both of the first and second switching elements are turned OFF. Accordingly, in the power conversion apparatus of the present disclosure, there is provided a period in which both of the first and second switching elements are in an OFF-state to thereby decrease the current passing through the choke coil in this period. Thus, the power conversion apparatus of the present disclosure is able to prevent current accumulated in the choke coil from keeping increasing. As a result, degradation or failure of the DCDC converter is minimized.

In contrast, when the capacitive load voltage is large, such as when charge of the capacitive load progresses, the value of the input voltage will be smaller than a value obtained by dividing the capacitive load voltage by a turn ratio. Therefore, when either one of the first and second switching elements is turned ON, the current passing through the choke coil will decrease. To cope with this, when the capacitive load voltage is larger than the first predetermined value, a control is performed using the third mode, under which a phase difference between the first and second PWM signals is a half of the control cycle, and Duty values of the first and second PWM signals are ensured to be an equal in value and more than 0.5.

Alternatively, when the capacitive load voltage is larger than the first predetermined value, a control is performed using the third mode, under which a control of turning ON one of the first and second switching elements and turning OFF the other switching element is alternated with a control of turning ON both of the first and second switching elements.

In the power conversion apparatus of the present disclosure, under the control of the third mode, a state where both of the first and second switching elements are turned ON is alternated with a state where one of the first and second switching elements is turned ON. Accordingly, the power conversion apparatus of the present disclosure can increase a current passing through the choke coil in a period in which both of the first and second switching elements are in an ON-state. In the power conversion apparatus of the present disclosure, the current passing through the choke coil is decreased in a period in which either one of the first and second switching elements is turned ON. Thus, rapid charge is conducted for a capacitive load in which charge is progressing.

A power conversion apparatus of the present disclosure includes: a direct current power supply; and a choke coil having an input terminal connected to a positive terminal of the direct current power supply. In addition, the power conversion apparatus includes: a first coil having a center tap, with both ends connected to a predetermined connecting point, one end via a first switching element and the other end via a second switching element; a second coil magnetically coupled to the first coil; and a capacitive load connected to the second coil via a rectifying circuit. In addition, the power conversion apparatus includes: a capacitive load voltage detecting means detecting a capacitive load voltage that is a voltage of the capacitive load; and a pulse generation unit transmitting a first PWM signal and a second PWM signal having an equal control cycle and serving as driving signals for the switching elements, the first PWM signal being transmitted to the first switching element, the second PWM signal being transmitted to the second switching element. In the power conversion apparatus of the present disclosure, the center tap is connected to a negative terminal of the power supply and the predetermined connecting point is connected to an output terminal of the choke coil. Alternatively, in the power conversion apparatus, the center tap is connected to an output terminal of the choke coil and the predetermined connecting point is connected to a negative terminal of the power supply. In the power conversion apparatus, when the capacitive load voltage is not larger than a second predetermined value that is smaller than a first predetermined value, the following control is defined as a first mode. A phase difference between the first and second PWM signals corresponds to a half of the control cycle, and Duty values of the first and second PWM signals are an equal in value and less than 0.5. In the power conversion apparatus, when the capacitive load voltage is larger than the second predetermined value but not larger than the first predetermined value, the following control is defined as a second mode. A phase difference between the first and second PWM signals corresponds to one control cycle, the first and second PWM signals are signals where a signal of a first Duty value is alternated with a signal of a second Duty value different from the first Duty value on a control-cycle basis, and a result of adding the first Duty value and the second Duty value is less than 1. Further, a time point of switching the signal of the first Duty value from OFF to ON, and a time point of switching the signal of the second Duty value from OFF to ON have a difference corresponding to one control cycle. In the power conversion apparatus, when the capacitive load voltage is larger than the first predetermined value, the following control is defined as a third mode. A phase difference between the first and second PWM signals corresponds to a half of the control cycle, and Duty values of the first and second PWM signals are an equal in value and more than 0.5.

The power conversion apparatus of the present disclosure includes: a direct current power supply; and a choke coil having an input terminal connected to a positive terminal of the direct current power supply. In addition, the power conversion apparatus includes: a first coil having a center tap, with both ends connected to a predetermined connecting point, one end via a first switching element and the other end via a second switching element; a second coil magnetically coupled to the first coil; and a capacitive load connected to the second coil via a rectifying circuit. In addition, the power conversion apparatus includes: a capacitive load voltage detecting means detecting a capacitive load voltage that is a voltage of the capacitive load; and a pulse generation unit transmitting one of an ON signal for instructing state transition to ON, and an OFF signal for instructing state transition to OFF, to the first and second switching elements. In the power conversion apparatus of the present disclosure, the center tap is connected to a negative terminal of the direct current power supply and the predetermined connecting point is connected to an output terminal of the choke coil. Alternatively, in the power conversion apparatus, the center tap is connected to an output terminal of the choke coil and the predetermined connecting point is connected to a negative terminal of the direct current power supply. In the power conversion apparatus, when the capacitive load voltage is not larger than a second predetermined value that is smaller than a first predetermined value, the following control is defined as a first mode. In the first mode, a control of turning ON one of the first and second switching elements and turning OFF the other switching element is alternated with a control of turning OFF both of the first and second switching elements. In the power conversion apparatus, when the capacitive load voltage is larger than the second predetermined value but not larger than the first predetermined value, the following control is defined as a second mode. In the second mode, a control of turning ON both of the first and second switching elements, a control of turning ON one of the first and second switching elements and turning OFF the other switching element, and a control of turning OFF both of the first and second switching elements are sequentially repeated. In the power conversion apparatus, when the capacitive load voltage is larger than the first predetermined value, the following control is defined as a third mode. In the third mode, a control of turning ON one of the first and second switching elements and turning OFF the other switching element is alternated with a control of turning ON both of the first and second switching elements.

When the capacitive load voltage is not larger than a first predetermined value, charge under the control of the first mode increases the capacitive load voltage. When the value obtained by dividing the capacitive load voltage by the turn ratio of the coils is larger than the value of the input voltage, the increase in the current passing through the choke coil will be lowered to thereby lower the charging rate, if the current passing through the choke coil does not increase and the value obtained by dividing the capacitive load voltage by the turn ratio of the coils is smaller than the value of the input voltage.

To cope with this, when the value obtained by dividing the capacitive load voltage by the turn ratio of the coils is larger than the value of the input voltage, a second predetermined value that is smaller than the first predetermined value is set as a threshold of the capacitive load voltage. Then, when the capacitive load voltage is larger than the second predetermined value but not larger than a first predetermined value, the following control is performed. Firstly, a phase difference between the first and second PWM signals corresponds to one control cycle. Further, in a first PWM signal and a second PWM signal, a signal of a first Duty value is alternated with a signal of a second Duty value different from the first Duty value on a control-cycle basis. Further, a result of adding the first Duty value and the second Duty value is less than 1, and a time point of switching the signal of the first Duty value from OFF to ON, and a time point of switching the signal of the second Duty value from OFF to ON have a difference corresponding to one control cycle, and thus the control of the second mode is performed.

Alternatively, a control is performed using the second mode, under which, when the capacitive load voltage is larger than the second predetermined value but not larger than the first predetermined value, a control of turning ON both of the first and second switching elements, a control of turning ON one of the first and second switching elements and turning OFF the other switching element, and a control of turning OFF both of the first and second switching elements are sequentially repeated.

In the power conversion apparatus of the present disclosure, the control of the second mode can provide a period in which both of the first and second switching elements are turned ON, a period in which either one of the first and second switching elements is in turned ON, and a period in which both of the first and second switching elements are turned OFF.

That is, in the power conversion apparatus of the present disclosure, firstly, the first and second switching elements are concurrently turned ON to increase the current passing through the choke coil. Then, the ON-state of either one of the first and second switching elements is kept, and the other switching element is turned OFF. With this configuration, when the value of the input voltage is larger than a value obtained by dividing the capacitive load voltage by the turn ratio, the current passing through the choke coil will increase. In contrast, when the value of the input voltage is smaller than the value obtained by dividing the capacitive load voltage by the turn ratio, the current passing through the choke coil will decrease. Charge of the capacitive load is carried out in this period. After that, in the power conversion apparatus of the present disclosure, both of the first and second switching elements are turned OFF to decrease the current passing through the choke coil.

Accordingly, in the power conversion apparatus of the present disclosure, when charge of the capacitive load progresses and the capacitive load voltage has become equal to or larger than the second predetermined value, the current passing through the choke coil can be increased and thus the charging rate of the capacitive load can be improved. In the power conversion apparatus of the present disclosure, a period in which both of the first and second switching elements are turned OFF is provided in the second mode as well. As a result the current passing through the choke coil is prevented from being kept increasing.

BRIEF DESCRIPTION OF THE DRAWINGS

In the accompanying drawings:

FIGS. 5A-5C show diagrams illustrating PWM signals, where FIG. 5A is a diagram illustrating PWM signals in a first mode, FIG. 5B is a diagram illustrating PWM signals in a second mode, and FIG. 5C is a diagram illustrating PWM signals in a third mode;

FIG. 9A is a diagram illustrating control signals in a first mode, FIG. 9B is a diagram illustrating control signals in a second mode, and FIG. 9C is a diagram illustrating control signals in a third mode;

FIG. 10A is a diagram illustrating control signals in a first mode, FIG. 10B is a diagram illustrating control signals in a second mode, and FIG. 10C is a diagram illustrating control signals in a third mode;

DETAILED DESCRIPTION OF THE PREFERRED EMBODIMENTS

Figure 1:
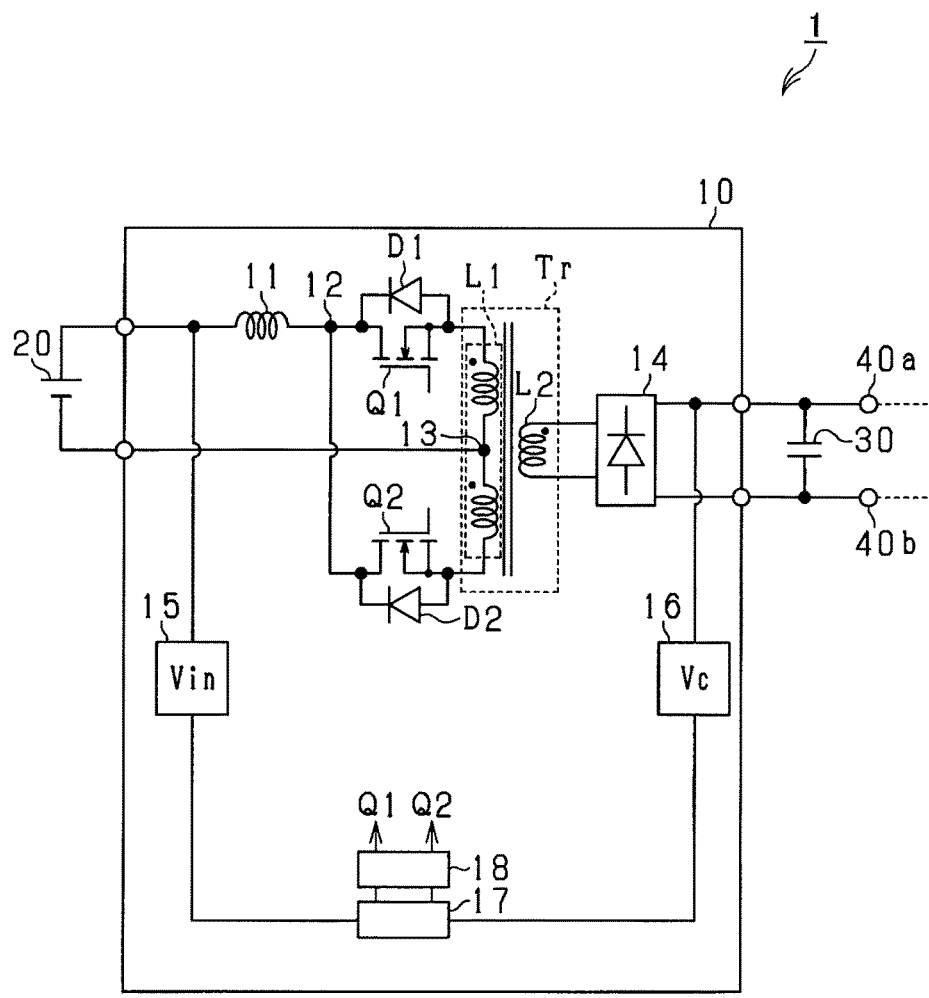
FIG. 1 is a circuit diagram illustrating a power conversion apparatus, according to a first embodiment.

With reference to the drawings, some embodiments will be described. In the embodiments described below, the parts identical with or equivalent to each other are given the same reference signs in the drawings and the same description is applied to the parts of identical reference signs.

First Embodiment

A power conversion apparatus according to the present embodiment is installed in a hybrid vehicle provided with a secondary battery, such as a lead battery with a nominal voltage of 12 V, and a high voltage battery, such as a lithium ion battery with a nominal voltage of several hundred V.

FIG. 1 shows a circuit diagram of a power conversion apparatus according to the present embodiment. A power conversion apparatus 1 according to the present embodiment includes a DCDC converter 10 and a secondary battery 20, which is a direct current power supply connected to input terminals of the DCDC converter 10. The power conversion apparatus 1 also includes a capacitive load 30 (smoothing capacitor) connected in parallel to output terminals of the DCDC converter 10, and connecting terminals 40a and 40b provided to the output terminals of the DCDC converter 10. Power accumulated in the secondary battery 20 is transformed by the DCDC converter 10 and outputted from the connecting terminals 40a and 40b. Power inputted from the connecting terminals 40a and 40b is transformed by the DCDC converter 10 and inputted to the secondary battery 20. To the connecting terminals 40a and 40b, a high voltage battery, an electrical load, a generator, and the like are connected, which are able to supply/receive power to/from the secondary battery 20.

The DCDC converter 10 is provided with a choke coil 11, a transformer Tr, a bridge circuit 14, a first switching element Q1, and a second switching element Q2.

The transformer Tr is composed of a first coil L1 and a second coil L2 that are magnetically coupled to each other, with the first coil L1 being provided with a center tap 13. The number of turns of the second coil L2 is N/2 times of the number of turns of the first coil L1. That is, the number of turns of the second coil L2 is N times of the number of turns of the first coil L1 covering from either one end thereof to the center tap 13. The second coil L2 is connected to the capacitive load 30 via the bridge circuit 14 and the output terminals of the DCDC converter 10.

The bridge circuit 14 is provided with a switching element and a diode to function as a rectifying circuit in supplying power from the first coil L1 side to the second coil L2 side and function as a switching circuit in supplying power from the second coil L2 side to the first coil L1 side.

The first switching element Q1 and the second switching element Q2 are MOSFETs. Of both ends of the first coil L1, one end is connected to a source of the first switching element Q1 and the other end is connected to a source of the second switching element Q2. On the other hand, both a drain of the first switching element Q1 and a drain of the second switching element Q2 are connected to a predetermined connecting point 12. To the predetermined connecting point 12, an output terminal of the choke coil 11 is connected, and an input terminal of the choke coil 11 is connected to a positive terminal of the secondary battery 20 via an input terminal of the DCDC converter 10. The center tap 13 of the first coil L1 is connected to a negative terminal of the secondary battery 20 via an input terminal of the DCDC converter 10. The first switching element Q1 and the second switching element Q2 have a first parasitic diode D1 and a second parasitic diode D2, respectively, which are in reverse parallel connection.

The DCDC converter 10 is provided with an input voltage detecting means 15, a capacitive load voltage detecting means 16, a pulse generation unit 17, and a driving circuit 18. The input voltage detecting means 15 detects an input voltage Vin inputted from the secondary battery 20 to the choke coil 11. The capacitive load voltage detecting means 16 detects a capacitive load voltage Vc of the capacitive load 30.

The input voltage Vin detected by the input voltage detecting means 15 and the capacitive load voltage Vc detected by the capacitive load voltage detecting means 16 are inputted to the pulse generation unit 17. The pulse generation unit 17 generates a first PWM signal which is a driving signal of the first switching element Q1, and a second PWM signal which is a driving signal of the second switching element Q2, on the basis of the inputted input voltage Vin and capacitive load voltage Vc, and transmits the generated PWM signals to the driving circuit 18. The driving signal herein refers to a signal instructing the first switching element Q1 or the second switching element Q2 state transition to either one of an ON state and an OFF state. The signal instructing state transition to ON (ON driving) is an ON signal, and the signal instructing state transition to OFF (OFF driving) is an OFF signal.

The driving circuit 18 drives the first switching element Q1 on the basis of the first PWM signal received from the pulse generation unit 17 and drives the second switching element Q2 on the basis of the second PWM signal.

In the present embodiment, the capacitive load 30 is charged by the power accumulated in the secondary battery 20. In this case, the DCDC converter 10 functions as a current input push-pull DCDC converter. When power supply of the vehicle is turned ON, a charge start command is generated in an ECU installed in the vehicle to start charge. On the other hand, charge is carried out using, as a target voltage, a voltage that is approximate to the voltage of the high voltage battery, until the capacitive load voltage Vc reaches the target voltage. As a value of the target voltage, a value memorized in a memory of the ECU may be used, or the value may be calculated on the basis of a measurement value of the voltage of the high voltage battery. As a method of acquiring the charge start command and the value of the target voltage, a means for acquiring them from outside the vehicle may be used.

Figure 2A:
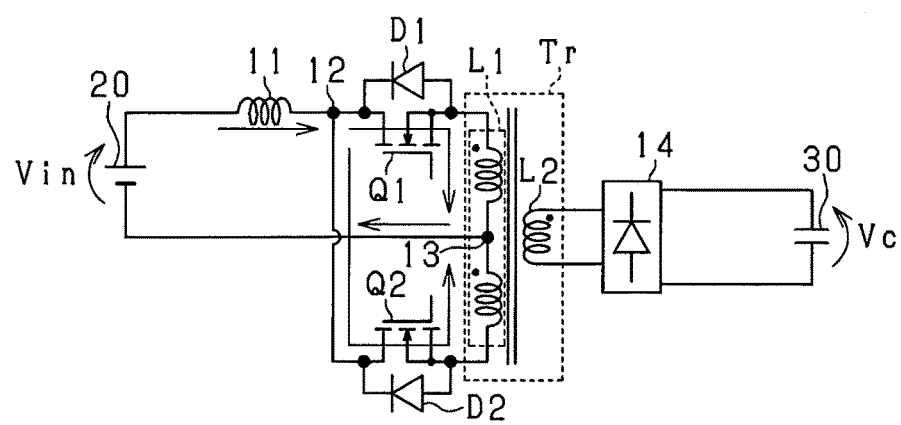
FIG. 2A is a diagram illustrating a current passing through the power conversion apparatus when both of a first switching element and a second switching element are turned ON, and FIG. 2B is a diagram illustrating the equivalent circuit.
Figure 2B:
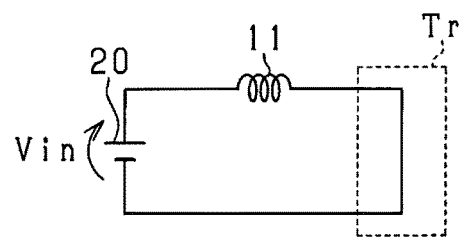

FIG. 2A shows a path of current passing through the circuit when both of the first and second switching elements Q1 and Q2 are turned ON in the present embodiment. FIG. 2B shows an equivalent circuit when both of the first and second switching elements Q1 and Q2 are turned ON in the present embodiment. In this state, since the first coil L1 is in a short-circuited state, the voltage of the first coil L1 is zero. Accordingly, the input voltage Vin is applied to the choke coil 11.

An increase $\Delta I$ per unit time [A/s] of the current passing through the choke coil 11 is expressed by the following equation (1), where L[H] is a self-inductance of the choke coil 11.

$$\Delta I = V\text{in}/L \qquad (1)$$

Specifically, the choke coil current increases in a linear manner. In the descriptions below, a period when both of the first and second switching elements Q1 and Q2 are turned ON is taken as a period α.

Figure 3A:
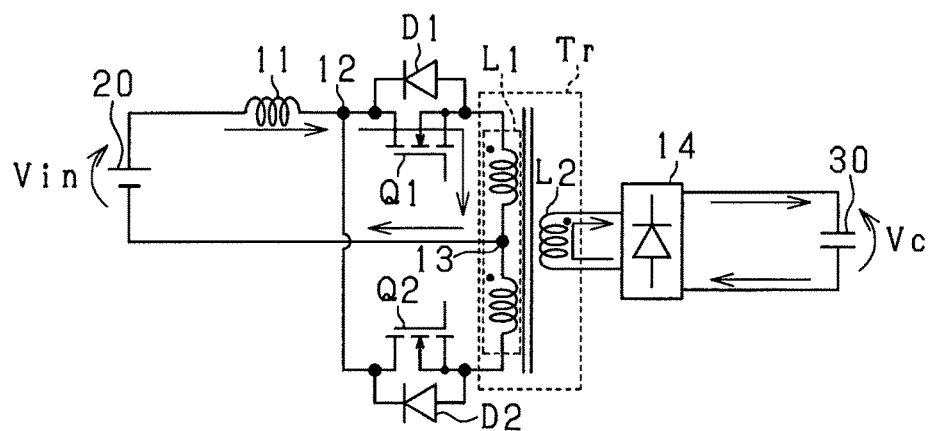
FIG. 3A is a diagram illustrating a passing through the power conversion apparatus when the first switching element is turned ON and the second switching element is turned OFF.
Figure 3B:
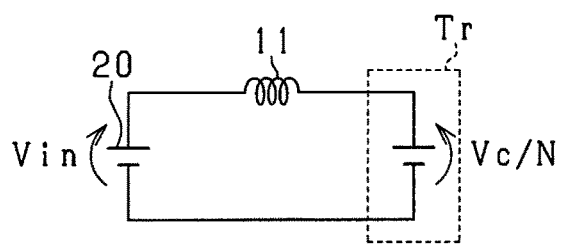
FIG. 3B is a diagram illustrating the equivalent circuit.

FIG. 3A shows a path of current passing through the circuit when the first switching element Q1 is turned ON and the second switching element Q2 is turned OFF in the present embodiment. FIG. 3B shows an equivalent circuit when the first switching element Q1 is in an ON state and the second switching element Q2 is in an OFF state in the present embodiment. The DCDC converter 10 is in a steady state and an output voltage Vout which is outputted from the second coil L2 of the transformer Tr is equal to the capacitive load voltage Vc. Under these conditions, whether the voltage applied to the choke coil 11 has a positive value or a negative value depends on the magnitude relationship between a value obtained by dividing the capacitive load voltage Vc by a turn ratio N and a value of the input voltage Vin. When the voltage applied to the choke coil 11 has a positive value, the choke coil current increases, but when having a negative value, decreases. In the present embodiment, when the first switching element Q1 is turned OFF and the second switching element Q2 is turned ON as well, the equivalent circuit will be similar to the one shown in FIG. 3B. In the following descriptions, a period in which either one of the first and second switching elements Q1 and Q2 is turned ON is taken as a period β.

The increase $\Delta I$ per unit time [A/s] in the choke coil current is expressed by the following equation (2).

$$\Delta I = (V\text{in} - Vc/N)/L \qquad (2)$$

Specifically, when the value of the input voltage Vin is larger than the value obtained by dividing the capacitive load voltage Vc by the turn ratio N, the increase $\Delta I$ has a positive value and thus the choke coil current increases. On the other hand, when the value of the input voltage Vin is smaller than the value obtained by dividing the capacitive load voltage Vc by the turn ratio N, the increase $\Delta I$ has a negative value and thus the choke coil current decreases. This means that when the capacitive load voltage Vc is small, such as when charge of the capacitive load 30 is started, the capacitive load 30 is charged in the period β as well. In contrast, when charge of the capacitive load 30 progresses and the capacitive load voltage Vc is increased, the choke coil current decreases and the charging rate in the period β is lowered.

When both of the first and second switching elements Q1 and Q2 are turned OFF, a back electromotive voltage having reverse polarity to the input voltage Vin is generated in the choke coil 11, which will decrease the choke coil current. In the following description, the period in which both the first and second switching elements Q1 and Q2 are in an OFF state is taken as a period γ.

The first and second switching elements Q1 and Q2 are controlled in a first mode, a second mode, and a third mode where a control cycle has a length Ts. In the first, second and third modes, Duty values are different. Each Duty value is obtained by dividing the length of the ON-state period of the first switching element Q1 and the length of the ON-state period of the second switching element Q2 by the length Ts of the control cycle. The first, second and third modes are switched on the basis of the magnitude relationship of a first predetermined value V1 and a second predetermined value V2, which is smaller than the first predetermined value V1, against the value of the capacitive load voltage Vc.

Specifically, when the capacitive load voltage Vc is not larger than the second predetermined value V2, the control is performed in the first mode. When the capacitive load voltage Vc is larger than the second predetermined value V2 but not larger than the first predetermined value V1, the control is performed in the second mode. When the capacitive load voltage Vc is larger than the first predetermined value V1, the control is performed in the third mode.

The second predetermined value V2 is set so as to increase the current passing through the choke coil 11 in the period β. That is, the second predetermined value V2 is set in such a way that the increase $\Delta I$ expressed by (2) has a positive value. On the other hand, the first predetermined value V1 is set so as to decrease the current passing through the choke coil 11 in the period β. That is, the first predetermined value V1 is set in such a way that the increase $\Delta I$ expressed by (2) has a negative value.

Figure 4:
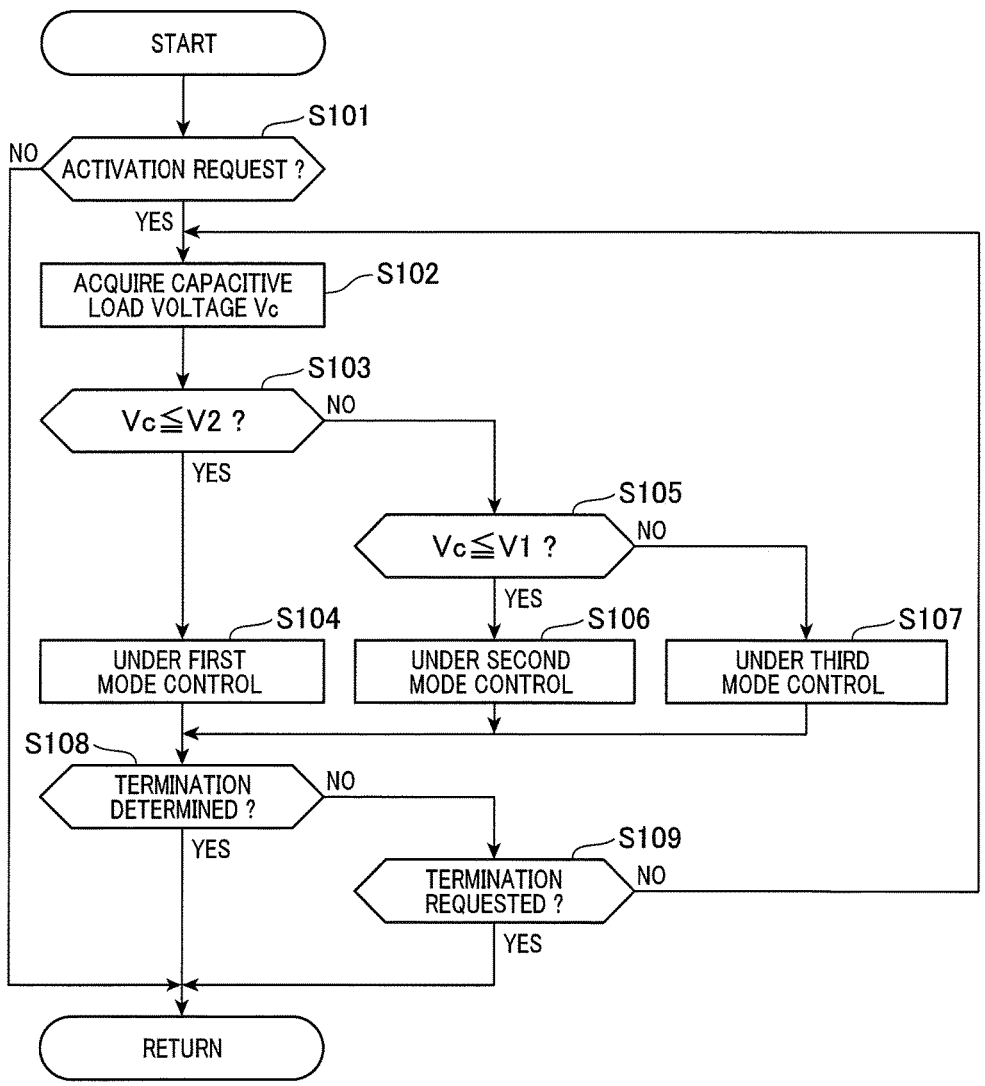
FIG. 4 is a flow chart illustrating a series of processing steps, according to the first embodiment.

FIG. 4 shows a series of processing steps performed by the pulse generation unit 17 according to the present embodiment in this case. Referring to a flow chart shown in FIG. 4, the present process will be described. The process according to the flow chart of FIG. 4 is performed at a predetermined control cycle.

In the power conversion apparatus 1 according to the present embodiment, it is determined, firstly, whether or not an activation request has been acquired (S101). A command signal for the activation request is sent, for example, from the ECU or the like, which is a higher-order control device. In the power conversion apparatus 1, if it is determined that an activation request has not acquired (NO at S101), the series of control processing steps is not performed but a standby state is kept.

In contrast, in the power conversion apparatus 1, if it is determined that an activation request has been acquired (YES at S101), the capacitive load voltage Vc is acquired (S102) and it is determined whether or not the capacitive load voltage Vc not larger than the second predetermined value V2 (S103). As a result, in the power conversion apparatus 1, if it is determined that the capacitive load voltage Vc is not larger than the second predetermined value V2 (YES at S103), the control is performed in the first mode (S104). In contrast, in the power conversion apparatus 1, if it is determined that the capacitive load voltage Vc is larger than the second predetermined value V2 (NO at S103), it is determined subsequently whether or not the capacitive load voltage Vc is not larger than the first predetermined value V1 (S105). As a result, in the power conversion apparatus 1, if it is determined that the capacitive load voltage Vc is not larger than the first predetermined value V1 (YES at S105), the control is performed in the second mode (S106). In contrast, in the power conversion apparatus 1, if it is determined that the capacitive load voltage Vc is larger than the first predetermined value V1 (NO at S105), the control is performed in the third mode (S107).

Subsequently, in the power conversion apparatus 1, after performing control of any of the first, second and third modes during predetermined time, a determination is made as to termination of the control process (S108). In the determination processing step (S108), for example, it is only required to re-acquire the capacitive load voltage Vc and determine whether or not the capacitive load voltage Vc has become equal to or larger than a predetermined upper limit. The determination as to whether the capacitive load voltage Vc has become equal to or larger than a predetermined upper limit may be performed after the capacitive load voltage Vc has been determined to be larger than the first predetermined value V1 (NO at S105). As a result, in the power conversion apparatus 1, if the control process is determined to be terminated (YES at S108), the series of control processing steps is terminated and the control waits until an activation request is made. In contrast, in the power conversion apparatus 1, if the control process is determined not to be terminated (NO at S108), it is determined whether or not a termination request has been acquired (S109). A command signal for the termination request is sent from a high-order control device, such as the ECU. In the power conversion apparatus 1, if it is determined that a termination request has been acquired (YES at S109), the series of control processing steps is terminated and the control waits until an activation request is made. In contrast, in the power conversion apparatus 1, if it is determined that a termination request has not been acquired (NO at S109), the control returns to the processing step for acquiring the capacitive load voltage Vc (S102) to reiterate the processing steps onward.

Although the flow chart of FIG. 4 shows only the processing steps related to the charge control for the capacitive load 30, the DCDC converter 10 also controls power conversion and the like, besides the charge control for the capacitive load 30. Specifically, the controls performed by the DCDC converter 10 may include, for example, a control under which power supplied via the connecting terminals 40a and 40b is stepped down to charge the secondary battery 20. Since the control is well known, a detailed description is omitted.

FIG. 5A shows the first PWM signal as a driving signal of the first switching element Q1, and the second PWM signal as a driving signal of the second switching element Q2, in performing the control in the first mode in the present embodiment. In the first mode, a phase difference between the first and second PWM signals is Ts/2 which is half of the control cycle (half-cycle). In both of the first and second PWM signals, one control cycle is composed of an ON-state period in indicated by a length T1 and an OFF-state period in indicated by a length (Ts−T1). In this case, the length T1 of the ON-state period is less than Ts/2. That is, a Duty value indicated by T1/Ts is less than 0.5. Accordingly, in the first mode, the period β of the length T1 and the period γ of the length (Ts/2−T1) are alternated.

In the first mode, in the period β, the capacitive load 30 is charged and the choke coil current increases. On the other hand, in the first mode, in the period γ, the choke coil current increased in the period β is consumed in the circuit. The length T1 in an ON-state period is set such that the choke coil current becomes zero in the period γ.

FIG. 5B shows the first PWM signal as a driving signal of the first switching element Q1, and the second PWM signal as a driving signal of the second switching element Q2, when the control is performed in the second mode in the present embodiment. In the second mode, the phase difference between the first and second PWM signals is Ts. In both the first and second PWM signals, a first control cycle and a second control cycle are alternated. The first control cycle is started from an ON-state period indicated by a length T2h and is terminated with an OFF-state period indicated by a length (Ts−T2h). The second control cycle is started from an ON-state period indicated by a length T2l and is terminated with an OFF-state period indicated by a length (Ts−T2l). That is, the time point when the ON-state period of the length T2h of the first PWM signal is started coincides with the time point when the ON-state period of the length T2l of the second PWM signal is started. In addition, the time point when the ON-state period of the length T2l of the first PWM signal is started coincides with the time point when the ON-state period of the length T2h of the second PWM signal is started. Further, summation of the value of T2h/Ts as the first Duty value in the first control cycle, and the value of T2l/Ts as the second Duty value in the second control cycle, is less than 1.

Accordingly, during one control cycle of the second mode, the period α of the length T2l, the period β of the length (T2h−T2l), and the period γ of the length (Ts−T2h) are repeated in this order.

In the period α of the second mode, the choke coil current increases. In the period β of the second mode, the choke coil current increases or decreases on the basis of the magnitude relationship between the value obtained by dividing the capacitive load voltage Vc by a turn ratio N and the value of the input voltage Vin. In the period γ of the second mode, the choke coil current increased in the periods α and β, or the choke coil current not reduced to zero in the period β, is consumed in the circuit. The lengths T2h and T2l of the ON-state period are set such that the choke coil current becomes zero in the period γ.

FIG. 5C shows the first PWM signal as a driving signal of the first switching element Q1 and the second PWM signal as a driving signal of the second switching element Q2 in performing the control in the third mode of the present embodiment. In the third mode, the phase difference between the first and second PWM signals is Ts/2. In both the first and second PWM signals, one control cycle is composed of an ON-state period indicated by a length T3 and an OFF-state period indicated by a length (Ts−T3). In this case, the length T3 of the ON-state period is larger than Ts/2 which is half the length of the control cycle. That is, a Duty value indicated by T3/Ts is larger than 0.5. Accordingly, in the third mode, the period α of a length (T3−Ts/2) and the period β of the length (Ts−T3) are alternated.

In the period α of the third mode, the choke coil current increases. In contrast, in the period β of the third mode, the choke coil current decreases, and with the decrease of the choke coil current, the capacitive load 30 is charged. The length T3 of the ON-state period is set such that the increase in the choke coil current in the period α is equal to the decrease in the choke coil current in the period β.

A Duty value in the third mode, which is Duty3 having a value more than 0.5, is changed with the progress of charging of the capacitive load 30. The Duty3 is set to Duty0 that is an initial value larger than 0.5 when the second mode is switched to the third mode.

In the third mode, the increase of current in the period α is equal to the decrease of current in the period β. Accordingly, a value zero is resulted from the summation of a value obtained by multiplying the increase of current per unit time in the period α (ΔI in (1)) by the length (T3−Ts/2) in the period α and a value obtained by multiplying the increase of current per unit time in the period β (ΔI in (2)) by the length (Ts−T3) in the period β. Thus, the equation (3) is obtained. In this case, the capacitive load voltage Vc and the output voltage Vout are assumed to be different. Accordingly, in (2), the capacitive load voltage Vc is substituted by the output voltage Vout.

$$(T3-Ts/2) \times Vin + (Ts-T3) \times (Vin - Vout/N) = 0 \qquad (3)$$

In the present embodiment, using Duty3 that is the Duty value of the PWM signal in the third mode, (3) is transformed. As a result, the output voltage Vout of the transformer Tr is expressed by the following equation (4).

$$Vout = N \times Vin/(2 \times (1 - Duty3)) \qquad (4)$$

There may occur divergence between the output voltage Vout and the capacitive load voltage Vc when the second mode is switched to the third mode. In such a case, when the circuit is assumed to be an ideal circuit with no resistance, an inrush current of infinite magnitude is unavoidably caused. In this case, if the circuit is not an ideal circuit, an inrush current is likely to be caused.

In this regard, in the present embodiment, the first predetermined value V1 serving as a condition for switching the second mode to the third mode, is set as follows. In the present embodiment, when the second mode is switched to the third mode, the first predetermined value V1 is set by the following equation (5) using Duty0 mentioned above in such a way that the first predetermined value V1 as a threshold of the capacitive load voltage Vc is equal to the output voltage Vout.

$$V1 = N \times Vin/(2 \times (1 - Duty0)) \qquad (5)$$

Specifically, in the present embodiment, the first predetermined value V1 that is a value of the capacitive load voltage Vc when the second mode is switched to the third mode is ensured to be equal to the output voltage Vout of the transformer Tr.

As described above, the value of Duty3 as a Duty value in the third mode is changed with the progress of charging of the capacitive load 30. Therefore, when divergence occurs between the output voltage Vout and the capacitive load voltage Vc with the change of the value of Duty3 and when the circuit is assumed to be an ideal circuit with no resistance, an inrush current having an infinite magnitude is unavoidably caused. In this case, if the circuit is not an ideal circuit, an inrush current is likely to be caused. Therefore, in the present embodiment, (4) is transformed by substituting the output voltage Vout by the capacitive load voltage Vc. In the present embodiment, the value of Duty3 is set by the following equation (6) obtained by the transformation.

$$Duty3 = 1 - N \times Vin/(2 \times Vc) \qquad (6)$$

That is, in the present embodiment, Duty3 is set in such a way that the capacitive load voltage Vc is equal to the output voltage Vout of the transformer Tr.

Depending on the initial value and the target value of the capacitive load voltage Vc, not all of the first to third modes are performed. That is, when an initial value of the capacitive load voltage Vc is not larger than the second predetermined value V2 and a target value of the capacitive load voltage Vc is larger than the first predetermined value V1, charge is performed in the first to third modes. In contrast, the following controls will be performed when at least one of the following conditions is satisfied, the conditions being that the initial value of the capacitive load voltage Vc is larger than the second predetermined value V2 and that the target value of the capacitive load voltage Vc is not larger than the first predetermined value V1.

When the target value of the capacitive load voltage Vc is not larger than the second predetermined value V2, charge is started in the first mode without transition to another mode, and thus the charge is terminated in the first mode.

When the initial value of the capacitive load voltage Vc is not larger than the second predetermined value, and the target value of the capacitive load voltage Vc is larger than the second predetermined value V2 but not larger than the first predetermined value V1, charge is started in the first mode without routing through the third mode, and thus the charge is terminated in the second mode.

When the initial value of the capacitive load voltage Vc is larger than the second predetermined value V2 but not larger than the first predetermined value V1, and the target value of the capacitive load voltage Vc is larger than the second predetermined value V2 but not larger than the first predetermined value V1, charge is started in the second mode without transition to another mode, and thus the charge is terminated in the second mode.

When the initial value of the capacitive load voltage Vc is larger than the second predetermined value V2 but not larger than the first predetermined value V1, and the target value of the capacitive load voltage Vc is larger than the first predetermined value V1, charge is started in the second mode without routing through the first mode, and thus the charge is terminated in the third mode.

When the initial value of the capacitive load voltage Vc is a value larger than the first predetermined value V1, charge is started in the third mode without transition to another mode, and thus the charge is terminated in the third mode.

With the above configuration, the power conversion apparatus 1 according to the present embodiment exhibits the following advantageous effects.

In the power conversion apparatus 1 according to the present embodiment, when the capacitive load voltage Vc is small, such as when charge to the capacitive load 30 is started, a control in the first mode is performed. Thus, the power conversion apparatus 1 is provided with the period β in which either one of the first and second switching elements Q1 and Q2 is turned OFF, and the period γ in which both of the first and second switching elements Q1 and Q2 are turned OFF. Therefore, in the power conversion apparatus 1 according to the present embodiment, the current increased in the choke coil 11 in the period β can be decreased in the period γ. Thus, the power conversion apparatus 1 can prevent the current passing through the choke coil 11 from being kept increasing. As a result, degradation and failure of the DCDC converter 10 may be minimized.

In the power conversion apparatus 1 according to the present embodiment, when the capacitive load voltage Vc is larger than the second predetermined value V2, the control in the second mode is performed. Thus, the power conversion apparatus 1 is provided with the period α in which both the first and second switching elements Q1 and Q2 are turned ON, the period β in which either one of the first and second switching elements Q1 and Q2 is OFF, and the period γ in which both the first and second switching elements Q1 and Q2 are turned OFF. Therefore, in the power conversion apparatus 1 according to the present embodiment, the current passing through the choke coil 11 in the period α can be increased and the charging rate for the capacitive load 30 can be improved. In the power conversion apparatus 1, the current in the choke coil 11 can be decreased in the period γ. Thus, the power conversion apparatus 1 can prevent the current passing through the choke coil 11 from being kept increasing. As a result, degradation and failure of the DCDC converter 10 can be minimized.

In the power conversion apparatus 1 according to the present embodiment, when the capacitive load voltage Vc is larger than the first predetermined value V1, such as when charge of the capacitive load 30 is progressing, the control in the third mode is performed. Thus, the power conversion apparatus 1 is provided with the period α in which both the first and second switching elements Q1 and Q2 are turned ON, and the period β in which either one of the first and second switching elements Q1 and Q2 is turned ON. Accordingly, in the power conversion apparatus 1, the current passing through the choke coil 11 in the period α can be increased, and the current passing through the choke coil 11 in the period β can be decreased. With this configuration, in the power conversion apparatus 1 according to the present embodiment, the capacitive load 30, in which charge is progressing, can be rapidly charged.

When the capacitive load voltage Vc exceeds the first predetermined value V1, there may be a difference between the output voltage Vout of the transformer Tr and the capacitive load voltage Vc. In such a case, when the circuit is assumed to be an ideal circuit having no resistance, an inrush current is likely to be caused, which leads to a high probability of causing damage to the circuit. In the power conversion apparatus 1 according to the present embodiment, the first predetermined value V1 is set such that the output voltage Vout is equal to the capacitive load voltage Vc when the capacitive load voltage Vc exceeds the first predetermined value V1. Therefore, in the power conversion apparatus 1, there is no potential difference between the output voltage Vout of the transformer Tr and the capacitive load voltage Vc. With this configuration, the power conversion apparatus 1 according to the present embodiment can minimize the occurrence of an inrush current.

When the control of the third mode is performed, there may be a difference between the output voltage Vout of the transformer Tr and the capacitive load voltage Vc. In such a case, when the circuit is assumed to be an ideal circuit having no resistance, an inrush current is likely to be cause, which leads a high probability of causing damage to the circuit. In the power conversion apparatus 1 according to the present embodiment, when the control of the third mode is performed, Duty3 as a Duty value in the third mode is set such that the output voltage Vout is equal to the capacitive load voltage Vc. Therefore, in the power conversion apparatus 1, there is no potential difference between the output voltage Vout of the transformer Tr and the capacitive load voltage Vc. With this configuration, the power conversion apparatus 1 according to the present embodiment can minimize the occurrence of an inrush current.

Second Embodiment

A power conversion apparatus according to the present embodiment corresponds to a circuit similar to the power conversion apparatus 1 of the first embodiment, but the control method is different. In the power conversion apparatus according to the present embodiment, the control of the second mode is not performed. In the power conversion apparatus according to the present embodiment, charge is performed in the first mode while the capacitive load voltage Vc is not larger than the first predetermined value V1, and charge is performed in the third mode when the capacitive load voltage Vc becomes larger than the first predetermined value V1. The first predetermined value V1 and the value of Duty3 as a Duty value in the third mode are set in a manner similar to the first embodiment.

In the present embodiment, it is not necessarily that both of the first and third modes are performed, depending on the initial value and the target value of the capacitive load voltage Vc. Specifically, charge is performed in the first and third modes when the initial value of the capacitive load voltage Vc is not larger than the first predetermined value V1 but the target value of the capacitive load voltage Vc is larger than the first predetermined value V1. In contrast, when the initial value of the capacitive load voltage Vc is larger than the first predetermined value V1, or when the target value of the capacitive load voltage Vc is not larger than the first predetermined value V1, the following controls are performed.

When the initial value of the capacitive load voltage Vc is larger than the first predetermined value V1, charge is started in the third mode without transition to another mode, and thus the charge is terminated in the third mode.

When the target value of the capacitive load voltage Vc not larger than is the first predetermined value V1, charge is started in the first mode without transition to another mode, and thus the charge is terminated in the first mode.

With the above configuration, the power conversion apparatus according to the present embodiment exhibits advantageous effects similar to those of the first embodiment.

Third Embodiment

Figure 6:
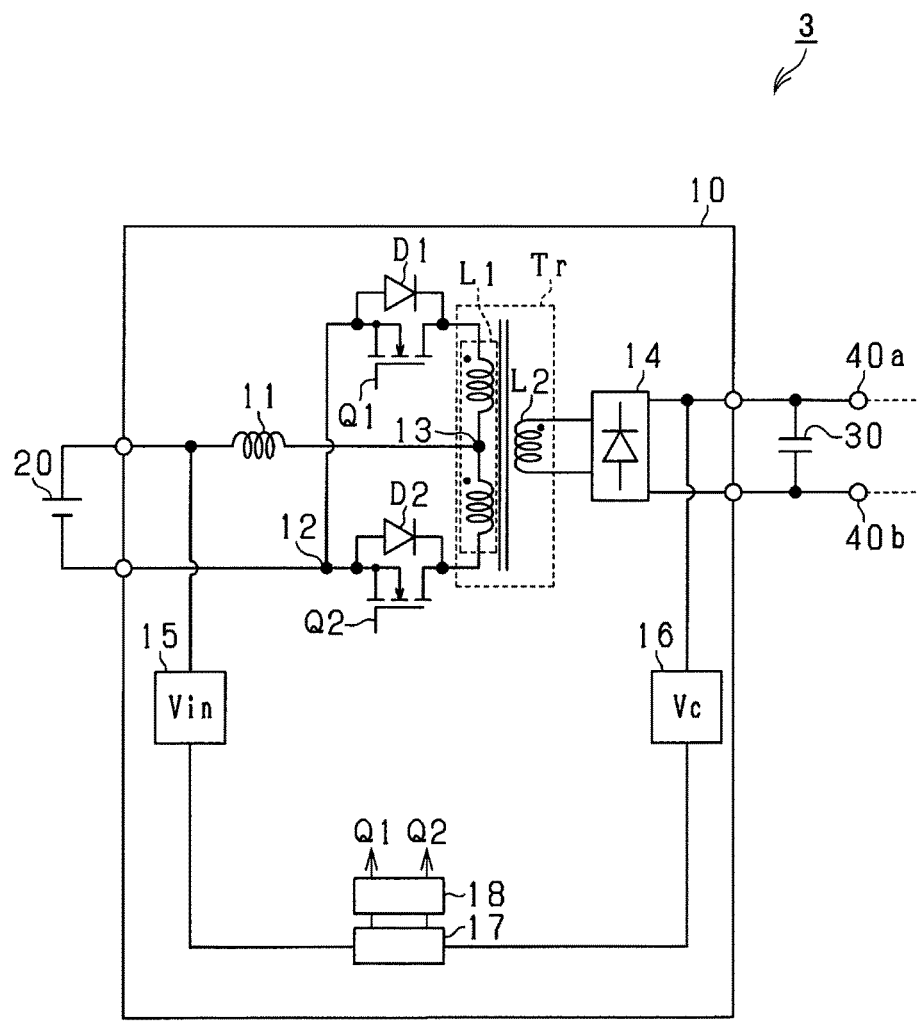
FIG. 6 is a circuit diagram illustrating a power conversion apparatus, according to a third embodiment.

FIG. 6 shows a circuit diagram of a power conversion apparatus according to the present embodiment. A power conversion apparatus 3 according to the present embodiment includes, similar to the power conversion apparatus 1 according to the first embodiment, a DCDC converter 10, and a secondary battery 20 serving as a direct current power supply connected to the input terminals of the DCDC converter 10. Further, the power conversion apparatus 3 includes a capacitive load 30 (smoothing capacitor) connected parallel to the output terminals of the DCDC converter 10, and connecting terminals 40*a* and 40*b* provided to the output terminals of the DCDC converter 10.

The DCDC converter 10 is provided with a choke coil 11, a transformer Tr, a bridge circuit 14, a first switching element Q1, and a second switching element Q2.

The transformer Tr is composed of a first coil L1 and a second coil L2 that are magnetically coupled to each other, with the first coil L1 being provided with the center tap 13. The second coil L2 is connected to the capacitive load 30 via the bridge circuit 14 and the output terminals of the DCDC converter 10.

The first switching element Q1 and the second switching element Q2 are MOSFETs. Among both ends of the first coil L1, one end is connected to a drain of the first switching element Q1 and the other end to a drain of the second switching element Q2. On the other hand, both a source of the first switching element Q1 and a source of the second switching element Q2 are connected to a predetermined connecting point 12. The predetermined connecting point 12 is connected to a negative terminal of the secondary battery 20 via an input terminal of the DCDC converter 10. The choke coil 11 has an input terminal connected to a positive terminal of the secondary battery 20 via an input terminal of the DCDC converter 10, and an output terminal connected to the center tap 13. The first switching element Q1 and the second switching element Q2 have a first parasitic diode D1 and a second parasitic diode D2, respectively, which are in reverse parallel connection. Thus, the power conversion apparatus 3 according to the present embodiment is different from the first embodiment in the connecting configuration of the first and second switching elements Q1 and Q2 to the first coil L1.

In the power conversion apparatus 3 according to the present embodiment, a control similar to the power conversion apparatus 1 of the first embodiment, or a control similar to the power conversion apparatus of the second embodiment is performed. Thus, the power conversion apparatus 3 according to the present embodiment exhibits advantageous effects similar to those the above embodiments.

Fourth Embodiment

A power conversion apparatus according to the present embodiment uses a circuit similar to the power conversion apparatus 1 of the first embodiment, or the power conversion apparatus 3 of the third embodiment, but a method of setting a Duty value in the first mode and a method of setting a Duty value in the second mode are different from the first to third embodiments. For the choke coil current, the present embodiment is provided with a maximum value which is less likely to cause degradation or the like of the DCDC converter 10 and allowable (maximum allowable value). Specifically, in the present embodiment, a first maximum allowable value Imax1 is provided to the first mode and a second maximum allowable value Imax2 is provided to the second mode. The first and second maximum allowable values Imax1 and Imax2 are memorized, for example, in a memory of the ECU or the like.

Figure 7:
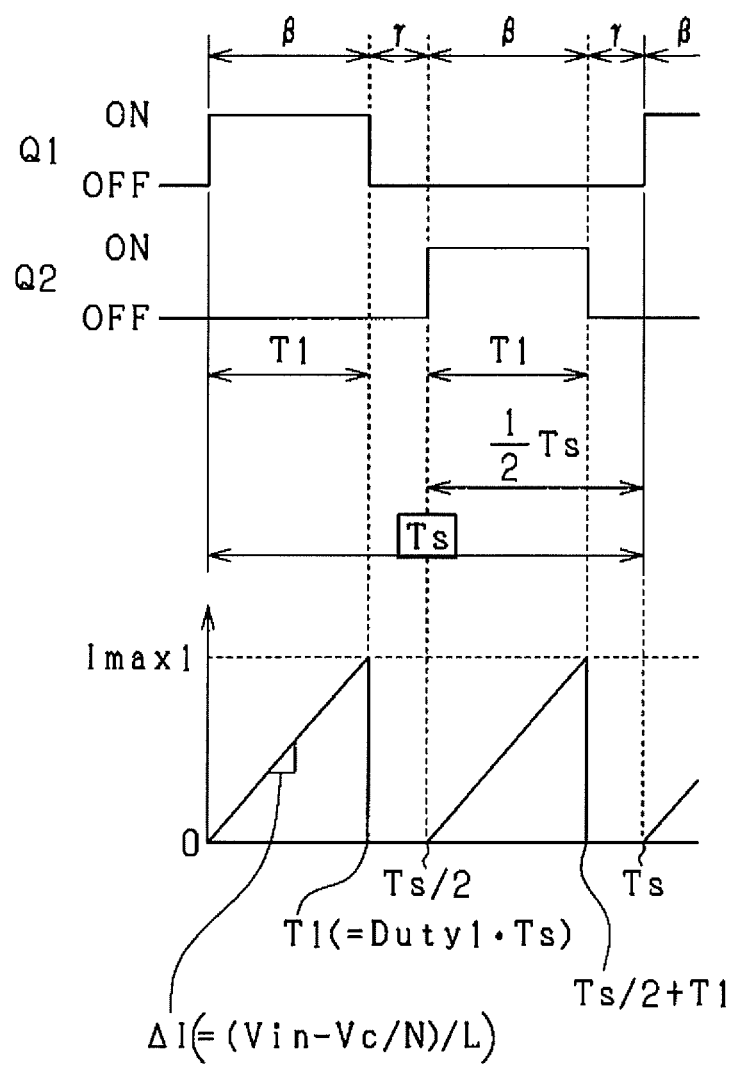
FIG. 7 is a diagram illustrating a relationship between a first maximum allowable value and a Duty value in a first mode, according to a fourth embodiment.

FIG. 7 shows a relationship between the Duty value and the first maximum allowable value Imax1 in the first mode of the present embodiment. In the first mode, Duty1 is set by the following equation (7) in such a way that the first maximum allowable value Imax1 is ensured to be a value obtained by multiplying an increase ΔI in the current per unit time in the period β, expressed by (2), by the length T1 in the period β. In this case, the length T1 in the period β is expressed as a product (Duty1·Ts) of Ts as the length of the control cycle, and Duty 1 as a Duty value. The input voltage Vin, the capacitive load voltage Vc, and L as a self-inductance of the choke coil 11 are constant in the period β.

$$\text{Duty1} = I\text{max1} \times L / \{Ts(V\text{in} - Vc/N)\} \quad (7)$$

Accordingly, in the first mode, the choke coil current becomes the first maximum allowable value Imax1 after turning ON the first and second switching elements Q1 and Q2 and after lapse of time corresponding to the length T1 of the period β.

Figure 8:
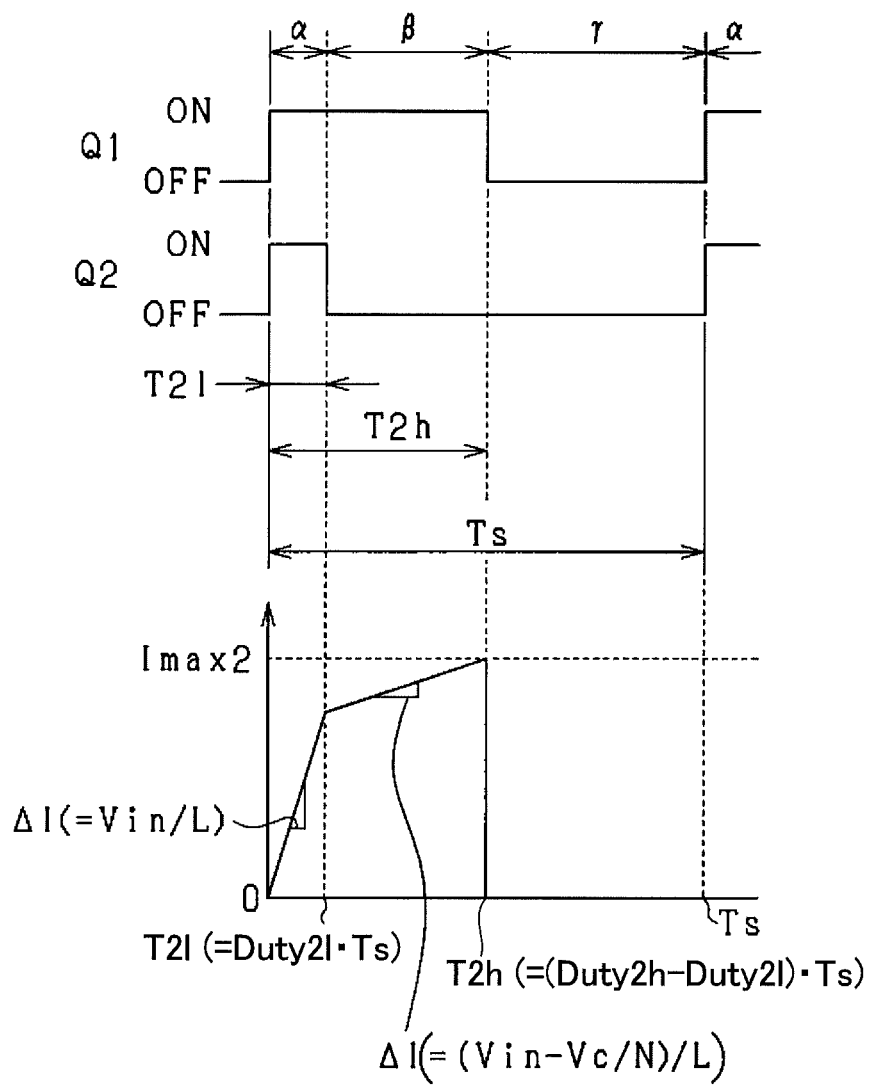
FIG. 8 is a diagram illustrating a second maximum allowable value and a Duty value in a second mode, according to the fourth embodiment.

FIG. 8 shows the Duty value and the second maximum allowable value Imax2 in the second mode of the present embodiment. In the second mode, Duty2*l* as a Duty value in the period α, and Duty2*h* as a Duty value corresponding to a sum of the periods α and β are set in such a way that the second maximum allowable value Imax2 is ensured to be a sum of an increase in the choke coil current in the period α and an increase in the choke coil current in the period β.

The increase in the choke coil current in the period α is obtained by multiplying the increase ΔI of current per unit time in the period α expressed by (1), by the length T2*l* of the period α. In this case, the length T2*l* of the period α is expressed as a product (Duty2*l*·Ts) of Ts as the length of the control cycle, and Duty2*l* as a Duty value. Therefore, in the second mode, Duty2*l* is set by the following equation (8) in such a way that the increase in the choke coil current in the period α is smaller than the second maximum allowable value Imax2.

$$\text{Duty2}l < I\text{max2} \times L / (Ts \times V\text{in}) \quad (8)$$

On the other hand, the increase in the choke coil current in the period β is obtained by multiplying the increase ΔI of current per unit time in the period β expressed by (2), by the length (T2*h*−T2*l*) of the period β. In this case, the length T2*h* of the period β is expressed as a product {(Duty2*h*−Duty2*l*)·Ts} of Ts as the length of the control cycle, and a difference in the Duty value (Duty2*h*−Duty2*l*). Thus, in the second mode, Duty2*h* is set by the equation (9) in such a way that the second maximum allowable value Imax2 is ensured to be a sum of the increase in the choke coil current in the period α and the increase in the choke coil current in the period β. In this case, for Duty2*l* that is a Duty value in the period α, the value set by (8) is used. The input voltage Vin, the capacitive load voltage Vc, and L as the self-inductance of the choke coil 11 are constant in the periods α and β.

$$\text{Duty2}h = \{(I\text{max2} \times L - V\text{in} \times \text{Duty2}l \times Ts) / \{Ts(V\text{in} - Vc/N)\}\} + \text{Duty2}l \quad (9)$$

Accordingly, in the second mode, the choke coil current becomes the second maximum allowable value Imax2 after turning on the first and second switching elements Q1 and Q2 and after lapse of time corresponding to the length T2*h* that is a sum of the periods α and β.

The first and second maximum allowable values Imax1 and Imax2 may be the same, or may be different from each other. When the setting of a Duty value of the present embodiment is applied to the power conversion apparatus of the second embodiment, the setting of Duty1 described above may only have to be performed in respect of the control of the first mode.

With the above configuration, the power conversion apparatus according to the present embodiment exhibits the following advantageous effects, besides the advantageous effects similar to those of the above embodiments.

In the first and second modes of the power conversion apparatus according to the present embodiment, Duty1, Duty2l, and Duty2h, as Duty values, are set in such a way that the choke coil current does not exceed the first and second maximum allowable values Imax1 and Imax2. Thus, in the power conversion apparatus according to the present embodiment, the choke coil current is not excessively increased to thereby minimize degradation or failure of the DCDC converter 10.

Fifth Embodiment

A power conversion apparatus according to the present embodiment uses a circuit similar to the power conversion apparatus 1 of the first embodiment or the power conversion apparatus 3 of the third embodiment, but the control method is different from the first to third embodiments. In the present embodiment, the control of the first to third modes is performed in a manner similar to the first embodiment, but the respective modes have control signals different from each other.

Figure 9A:
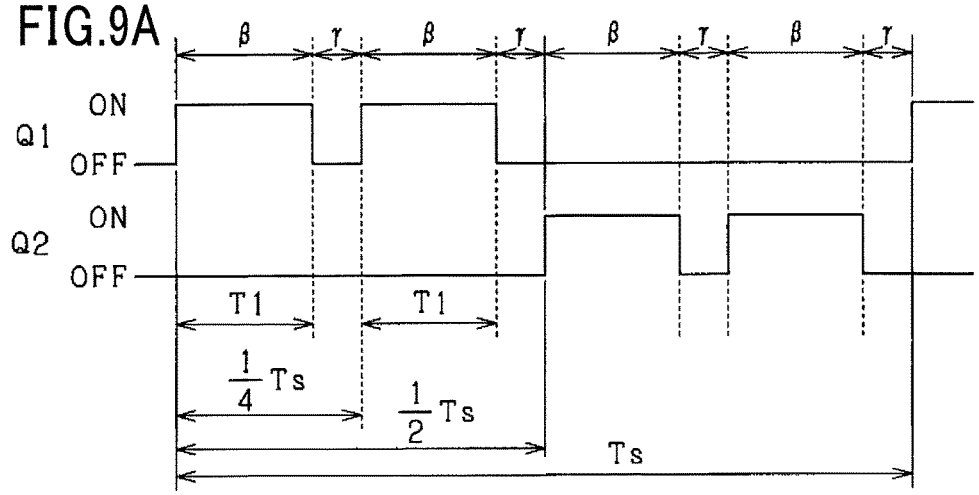
FIGS. 9A-9C show diagrams illustrating control signals, according to a fifth embodiment, where

FIG. 9A shows control signals in a first mode in the present embodiment. In the first mode, control signals are transmitted to first and second switching elements Q1 and Q2 at a common control cycle Ts, and control signals are transmitted with a mutual phase difference being a half of the control cycle Ts. The control signals instruct the first and second switching elements Q1 and Q2 to make a state transition to either one of ON- and OFF-states. The signal instructing a state transition to an ON-state (ON driving) is an ON signal, and the signal instructing a state transition to an OFF-state (OFF driving) is an OFF signal.

In the control signals transmitted to the first and second switching elements Q1 and Q2, an ON-state period with a length T1 (<Ts/4) and an OFF-state period with a length (Ts/4−T1) are alternated on a two-by-two basis in a half of the control cycle Ts. In the control signals, an OFF-state is kept in the subsequent half cycle (first predetermined period).

Specifically, under the control of the first mode, in a half of the control cycle Ts, one of the first and second switching elements Q1 and Q2 is kept in an OFF-state, and the other switching element is ensured to alternate an ON-state with an OFF-state. In this way, similar to the first embodiment, the present embodiment can alternate the period β in which one of the first and second switching elements Q1 and Q2 is in an ON-state and the other switching element is in an OFF-state, with the period γ in which both of the first and second switching elements Q1 and Q2 are in an OFF-state.

Figure 9B:
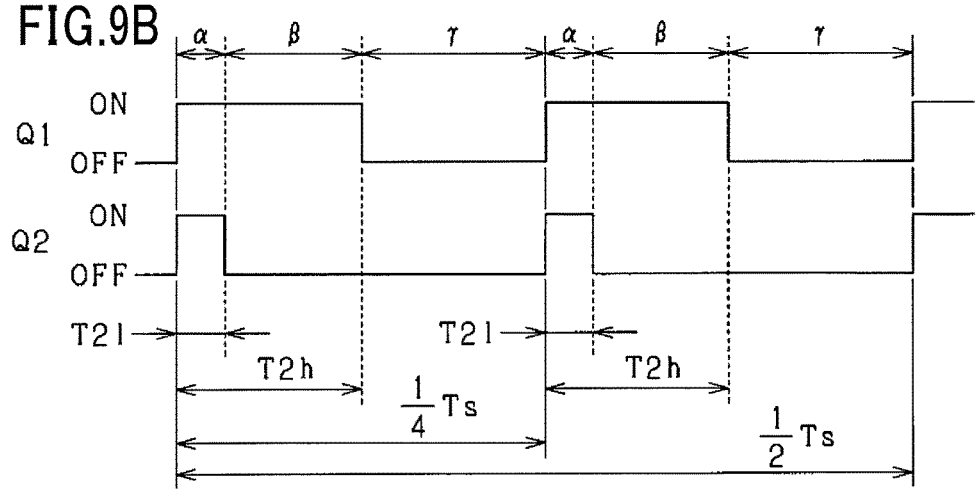

FIG. 9B shows control signals in a second mode of the present embodiment. In the second mode, control signals are transmitted to first and second switching elements Q1 and Q2 at a common control cycle Ts, and control signals are transmitted with a mutual phase difference being a half of the control cycle Ts.

In the control signals transmitted to the first and second switching elements Q1 and Q2, in a half of the control cycle Ts, an ON-state period of a length T2h (<Ts/4) is alternated with an OFF-state period of a length (Ts/4−T2h) on a two-by-two basis. In the subsequent half cycle of the control signals (first predetermined period), an ON-state period of a length T2l (<Ts/4) is alternated with an OFF-state period of a length (Ts/4−T2l) on a two-by-two basis. In this case, in each of the control signals transmitted to the first and second switching elements Q1 and Q2, a time point when the ON-state period of the length T2h is started and a time point when the ON-state period of the length T2l is started are mutually offset by half a cycle (Ts/2). Accordingly, the time point when the ON-state period of the first switching element Q1 is started coincides with the time point when the ON-state period of the second switching element Q2 is started.

In this way, similar to the first embodiment, the present embodiment, sequentially repeat the period α in which both of the first and second switching elements Q1 and Q2 are in an ON-state, the period β in which one of the first and second switching elements Q1 and Q2 is in an ON-state and the other switching element is in an OFF-state, and the period γ in which both of the first and second switching elements Q1 and Q2 are in an OFF-state.

Figure 9C:
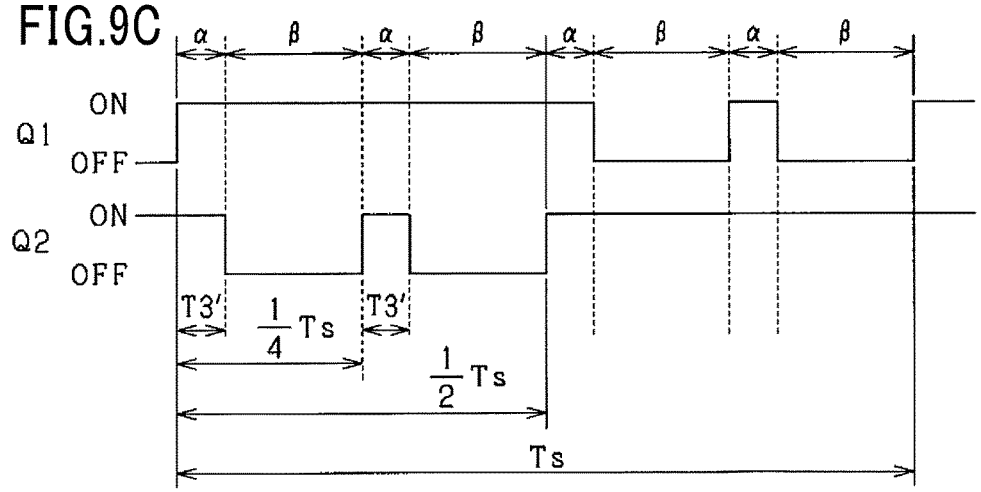

FIG. 9C shows control signals in a third mode of the present embodiment. In the third mode, control signals are transmitted to first and second switching elements Q1 and Q2 at a common control cycle Ts, and control signals are transmitted with a mutual phase difference being a half of the control cycle Ts.

In the control signals transmitted to the first and second switching elements Q1 and Q2, in a half of the control cycle Ts, an ON-state period of a length T3' (<Ts/4) is alternated with an OFF-state period of a length (Ts/4−T3') on a two-by-two basis. In the subsequent half cycle of the control signals (first predetermined period), the ON-state is kept.

Specifically, under the control of the third mode, in a half of the control cycle Ts, one of the first and second switching elements Q1 and Q2 is kept in an ON-state and the other switching element is permitted to alternate an ON-state and an OFF-state. In this way, similar to the first embodiment, the present embodiment can alternate the period α in which both of the first and second switching elements Q1 and Q2 are in an ON-state, with the period β in which one of the first and second switching elements Q1 and Q2 is in an ON-state and the other switching element is in an OFF-state.

In the present embodiment, in each of the first to third modes, the ON-state period is provided twice during a half of the control cycle Ts. Alternatively, the ON-state period may be provided three or more times.

Further, the length of the ON-state period of the first and second switching elements Q1 and Q2 in each of the first to third modes only has to be set in a manner similar to the first embodiment. Alternatively, the length of the ON-state period of the first and second switching elements Q1 and Q2 in each of the first and second modes may be set in a manner similar to the fourth embodiment.

In the present embodiment, similar to the second embodiment, the control in the first and third modes may be performed, and the second mode may be ensured not to be performed.

With the above configuration, the power conversion apparatus according to the present embodiment exhibits the advantageous effects similar to those of the above embodiments.

Sixth Embodiment

A power conversion apparatus according to the present embodiment uses a circuit similar to the power conversion apparatus 1 of the first embodiment or the power conversion apparatus 3 of the third embodiment, but the control method is different from the first to third embodiments. In the present embodiment, control of the first to third modes is performed similar to the first embodiment, but the control signals in the respective modes are different.

Figure 10A:
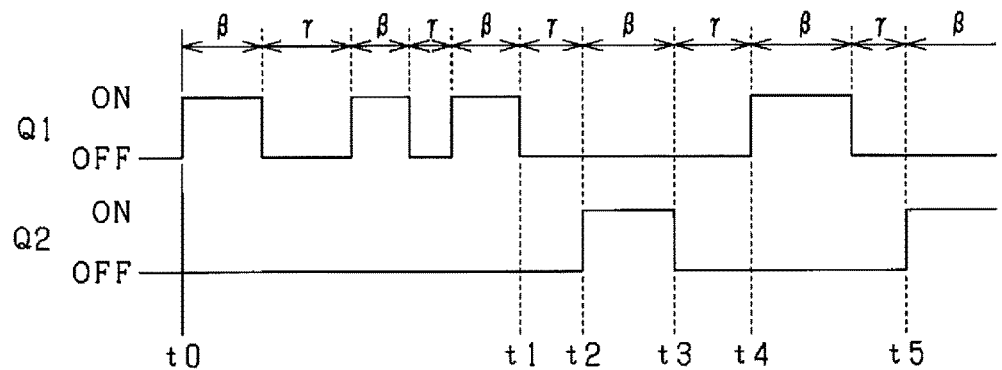
FIGS. 10A-10C show diagrams illustrating control signals, according to a sixth embodiment, where
Figure 10B:
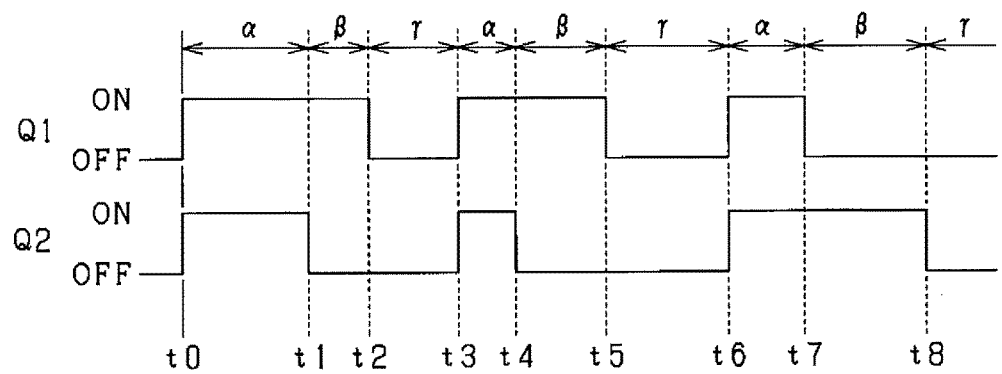
Figure 10C:
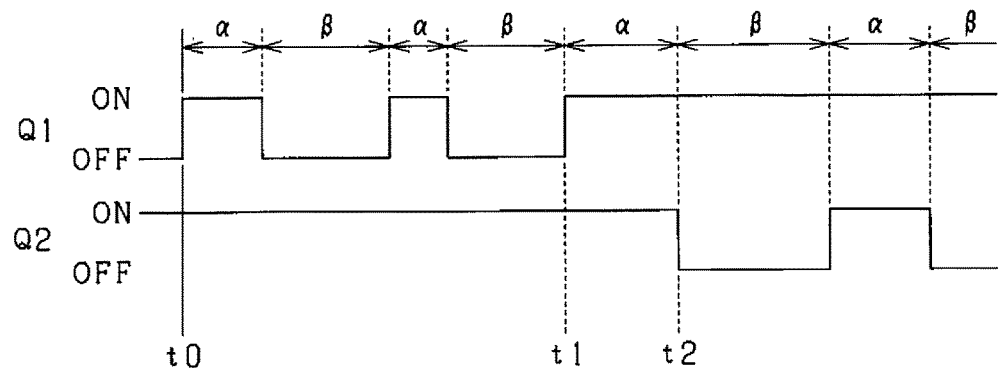

FIGS. 10A to 10C show control signals in the first to third modes in the present embodiment.

FIG. 10A shows control signals in the first mode of the present embodiment. As shown in FIG. 10A, in a predetermined period from t0 to t2 (first predetermined period) of the first mode, an OFF-state of the second switching element Q2 is kept, while an ON-state and an OFF-state of the first switching element Q1 are alternated. In a predetermined period from t1 to t4 (first predetermined period) of the first mode, an OFF-state of the first switching element Q1 is kept, while an ON-state and an OFF-state of the second switching element Q2 are alternated. Further, in a predetermined period from t3 to t5 (first predetermined period) of the first mode, an OFF state of the second switching element Q2 is kept, while an ON-state and an OFF-state of the first switching element Q1 are alternated.

In this case, the predetermined period in which the OFF-state of the first switching element Q1 is kept, and the predetermined period in which the OFF-state of the second switching element Q2 is kept may have the same length, or may have different lengths. The predetermined periods in which the OFF-state of the first switching element Q1 is kept may have the same length, or may have different lengths. The same applies to the predetermined periods in which the OFF-state of the second switching element Q2 is kept. Further, while one of the first and second switching elements Q1 and Q2 is in an OFF-state, an ON-state and an OFF-state of the other switching element may be alternated by any number times. While one of the first and second switching elements Q1 and Q2 is in an OFF-state, the periods in which an ON-state and an OFF-state of the other switching element are alternated may have the same length, or may have different lengths. For example, as shown in FIG. 10A, in the predetermined period from t0 to t2 (first predetermined period) in an OFF-state of the second switching element Q2, the first switching element Q1 may be in an ON-state once or twice. In the predetermined period from t1 to t4 (first predetermined period) in an OFF-state of the first switching element Q1, the second switching element Q2 may be in an ON-state several times.

Specifically, under the control of the first mode, the state where one of the first and second switching elements Q1 and Q2 is kept in an OFF-state is alternated with the state where the other switching element is alternately in an ON-state and an OFF-state. In this way, in the present embodiment, similar to the first embodiment, the period β in which one of the first and second switching elements Q1 and Q2 is in an ON-state and the other switching element is in an OFF-state can be alternated with the period γ in which both of the first and second switching elements Q1 and Q2 are in an OFF-state.

FIG. 10B shows control signals in the second mode of the present embodiment. As shown in FIG. 10B, in the second mode, both of the first and second switching elements Q1 and Q2 are turned ON at t0, the second switching element Q2 is turned OFF at t1, and the first switching element Q1 is turned OFF at t2. The OFF-state periods of the first and second switching elements Q1 and Q2 are kept until t3. Accordingly, a predetermined period from t0 to t1 is the period α in which both the first and second switching elements Q1 and Q2 are in an ON-state. A predetermined period from t1 to t2 is the period β in which one of the first and second switching elements Q1 and Q2 is in an ON-state. A predetermined period from t2 to t3 is the period γ in which both the first and second switching elements Q1 and Q2 are in an OFF-state. Similarly, in the second mode, both of the first and second switching elements Q1 and Q2 are turned ON at t3, the second switching element Q2 is turned OFF at t4, and the first switching element Q1 is turned OFF at t5. The OFF-states of the first and second switching elements Q1 and Q2 are kept until t6.

Subsequently, in the second mode, both the first and second switching elements Q1 and Q2 are turned ON at t6, the first switching element Q1 is turned OFF at t7, and the second switching element Q2 is turned OFF at t8. Therefore, the switching element which is in an ON-state in the period β from t7 to t8 is different from the one in the periods β from t1 to t2 and from t4 to t5.

under the control of the second mode, one of the first and second switching elements Q1 and Q2 may be turned OFF first at all times.

Specifically, the control of the second mode enables sequential repetition of the state where both of the first and second switching elements Q1 and Q2 are in an ON-state, the state where one of the first and second switching elements Q1 and Q2 is an ON-state and the other switching element is in an OFF-state, and the state where both of the first and second switching elements Q1 and Q2 are in an ON-state.

FIG. 10C shows control signals in the first mode of the present embodiment. As shown in FIG. 10C, in a predetermined period from t0 to t2 (second predetermined period) of the third mode, an ON-state of the second switching element Q2 is kept, while an ON-state and an OFF-state of the first switching element Q1 are alternated. In addition, in a predetermined period of t1 onward (second predetermined period) of the third mode, an ON-state of the first switching element Q1 is kept, while an ON-state and an OFF-state of the second switching element Q2 are alternated.

In this case, the predetermined period in which an ON-state of the first switching element Q1 is kept and the predetermined period in which an ON-state of the second switching element Q2 is kept may have the same length, or may have different lengths. The predetermined periods in which an ON-state of the first switching element Q1 is kept may have the same length, or may have different lengths. The same applies to the predetermined periods in which an ON-state of the second switching element Q2 is kept. Further, while one of the first and second switching elements Q1 and Q2 is in an ON-state, an ON-state and an OFF-state of the other switching element may be alternated by any number times. While one of the first and second switching elements Q1 and Q2 is in an ON-state, the periods in which an ON-state and an OFF-state of the other switching element are alternated may have the same length, or may have different lengths. For example, as shown in FIG. 10C, in the predetermined period from t0 to t2 (second predetermined period) in which the second switching element Q2 is in an ON-state, the first switching element Q1 may be in an ON-state only once, or three or more times. In the predetermined period of t1 onward (first predetermined period) in which the first switching element Q1 is in an ON-state, the second switching element Q2 may be in an ON-state only once, or three or more times.

Specifically, under the control of the third mode, one of the first and second switching elements Q1 and Q2 is kept in the ON state, while the other switching element alternates an ON-state and an OFF-state. In this way, in the present embodiment, the period α in which both of the first and second switching elements Q1 and Q2 are in an ON-state can be alternated with the period β in which one of the first and second switching elements Q1 and Q2 is in an ON-state and the other switching element is in an OFF-state.

Similar to the fourth embodiment, the ON-state period of the first and second switching elements Q1 and Q2 in each of the first and second modes may be set in such a way that the choke coil current does not exceed the first and second maximum allowable values Imax1 and Imax2. Further, the ON-state period of the first and second switching elements Q1 and Q2 in the third mode may be set using a method similar to the first embodiment.

The control signals shown in FIGS. 10A to 10C are only examples. The control of the first and second switching elements Q1 and Q2 may only need to be performed in the first to third modes.

Further, in the present embodiment, each of the first and second switching elements Q1 and Q2 is further provided with a timer that calculates an accumulated value of ON-state time. In the present embodiment, the control is performed in a predetermined period (third predetermined period) in such a way that the accumulated value of ON-state time in the first switching element Q1 is equal to an accumulated value of ON-state time in the second switching element Q2. In this way, in the present embodiment, the DCDC converter 10 is prevented from being magnetically deflected, and loss and heat generation are equalized between the first and second switching elements Q1 and Q2.

In this case, in each of the first to third modes, the accumulated value of ON-state time in the first switching element Q1 may be ensured to be equal to the accumulated value of ON-state time in the second switching element Q2. Further, the predetermined period (third predetermined period) may be extended over a plurality of modes. In this case, for example, if there is a difference, in the first mode, between the accumulated value of ON-state time of one of the first and second switching elements Q1 and Q2, and the accumulated value of ON-state time of the other switching element, the difference may only have to be compensated under the control of the second or third mode.

Further, if there is a difference between the accumulated value of ON-state time in the first switching element Q1 and the accumulated value of ON-state time in the second switching element Q2 at the time of terminating charge of the capacitive load 30, the difference may only have to be compensated in performing charge the next time.

The concept of "to be equal" in the present embodiment refers to "be in agreement with" in a range of tolerating predetermined errors.

With the above configuration, the power conversion apparatus according to the present embodiment exhibits the advantageous effects similar to those of the above embodiments.

Seventh Embodiment

Figure 11:
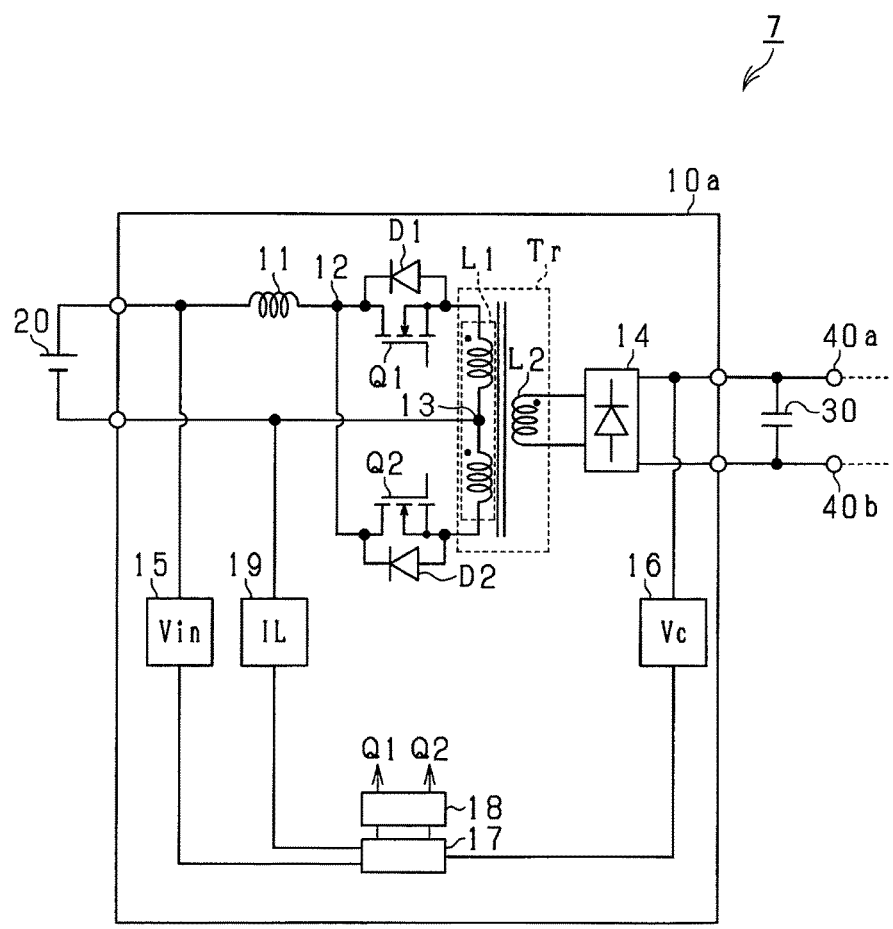
FIG. 11 is a circuit diagram of a power conversion apparatus, according to a seventh embodiment.

A power conversion apparatus according to the present embodiment is partially different in the circuit configuration from the power conversion apparatus 1 of the first embodiment, and is different in the process performed by the pulse generation unit 17. FIG. 11 shows a circuit diagram of a power conversion apparatus according to the present embodiment.

A power conversion apparatus 7 according to the present embodiment is further provided with a current detecting means 19. The current detecting means 19 detects a reactor current IL passing through the choke coil 11, and inputs the detected current into the pulse generation unit 17. The rest of the circuit configuration is similar to the circuit configuration of the first embodiment and thus the description is omitted. The rest of the circuit configuration may be similar to the circuit configuration of the third embodiment.

Figure 12:
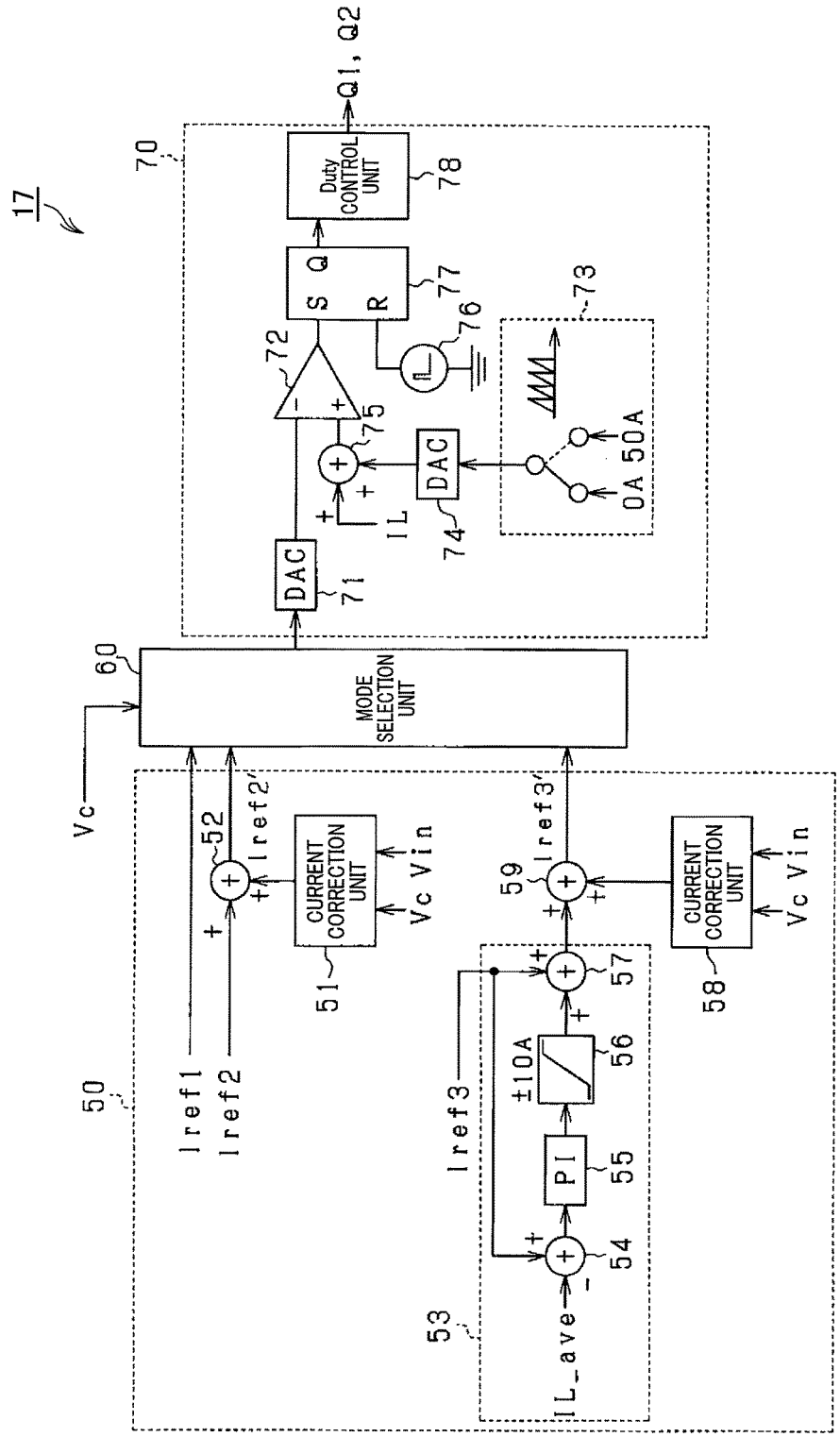
FIG. 12 is a block diagram illustrating processes performed by a pulse generation unit in the power conversion apparatus, according to the seventh embodiment.

Next, referring to FIG. 12, the process performed by the pulse generation unit 17 of the present embodiment will be described. FIG. 12 is a block diagram illustrating the process performed by the pulse generation unit 17 in the power conversion apparatus 7 of the present embodiment.

A constant current control unit 50 reads, from a memory, a first command Iref1 for the reactor current IL in the first mode, a second command Iref2 for the reactor current IL in the second mode, and a third command Iref3 for the reactor current IL in the third mode, for use in the control.

The first command Iref1 is determined so that avalanche current will not be excessive when one of the first and second switching elements Q1 and Q2 has transitioned from an ON-state to an OFF-state to thereby bring both of the switching elements into an OFF-state. The avalanche current is generated on the basis of the value of the first command Iref1. The first command Iref1 is directly outputted from the constant current control unit 50.

The second command Iref2 may have the same value as the first command Iref1. In this case, the second command Iref2 is determined so that avalanche current will not be excessive. The second command Iref2 may have a value different from the first command Iref1.

On the other hand, a current correction unit 51 accepts inputs of the input voltage Vin and the capacitive load voltage Vc and outputs a correction value to be added to the second command Iref2. An addition unit 52 adds the correction value outputted from the current correction unit 51 to the second command Iref2 and outputs a second corrected command Iref2' (corrected second command). The relationship of the input voltage Vin and the capacitive load voltage Vc relative to the correction value to be added to the second command Iref2 may be obtained from calculation. Alternatively, the relationship may be obtained on the basis of a predetermined table stored in a memory.

In the second mode controlled on the basis of the second command Iref2, the Duty value of the first switching element Q1 is fixed to 50% and the Duty value of the second switching element Q2 is changed. Specifically, in the second mode, the Duty value of the second switching element Q2 is changed in such a way that the value of the reactor current IL will be the second corrected command Iref2' in the period α in which the first and second switching elements Q1 and Q2 are in an ON-state. Further, in the second mode, the Duty value of the second switching element Q2 is changed in such a way that the value of the reactor current IL will be the second command Iref2 in the period β in which the first switching element Q1 is in an ON-state and the second switching element Q2 is in an OFF-state.

Figure 13A:
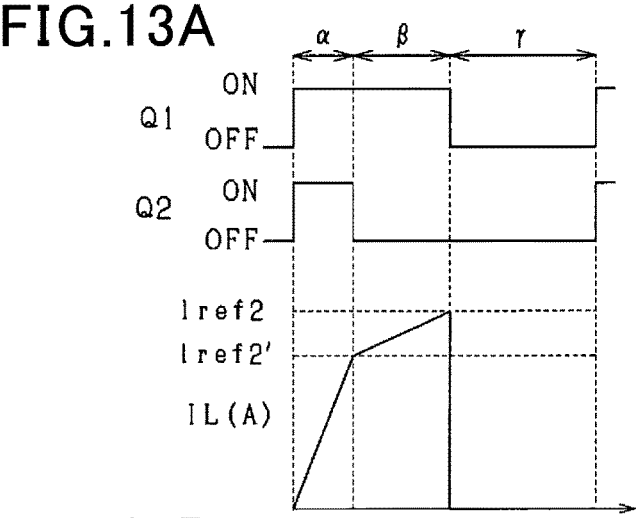
FIGS. 13A-13C show diagrams each illustrating a reactor current in a second mode, according to the seventh embodiment.
Figure 13B:
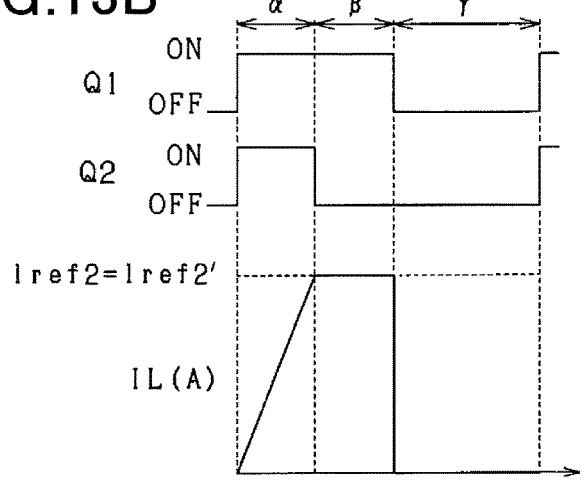
Figure 13C:
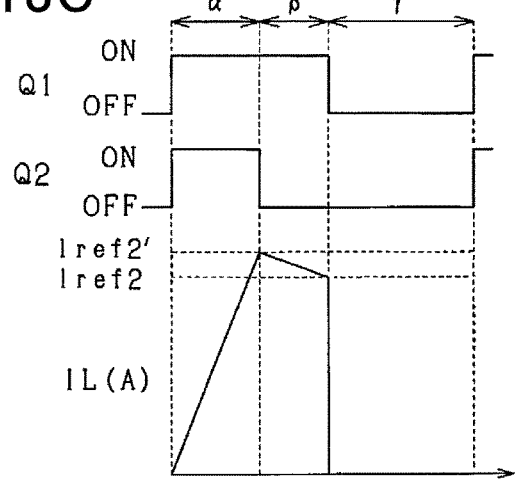

Referring to FIGS. 13A to 13C, the relationship between the second command Iref2 and the second corrected command Iref2' will be described.

FIG. 13A shows the reactor current IL when the value of the input voltage Vin is larger than a value obtained by dividing the capacitive load voltage Vc by a turn ratio N. In this case, the reactor current IL increases in the period β in which the first switching element Q1 is in an ON-state and the second switching element Q2 is in an OFF-state. Therefore, when the value of the reactor current IL at a time point of turning OFF the second switching element Q2 is taken as the second command Iref2, the reactor current IL is likely to be excessive. In this regard, in the second mode, at a time point of turning OFF the first switching element Q1, the period α in which the second switching element Q2 is in an ON-state is set in such a way that the value of the reactor current IL will be the second command Iref2.

FIG. 13B shows the reactor current IL when the value obtained by dividing the capacitive load voltage Vc by a turn ratio N is equal to the value of the input voltage Vin. In this case, in the period β, the reactor current IL neither increases nor decreases. Therefore, the second command Iref2 and the second corrected command Iref2' have the same value.

FIG. 13C shows the reactor current IL when the value of the input voltage Vin is smaller than the value obtained by dividing the capacitive load voltage Vc by a turn ratio N. In this case, in the period β, the reactor current IL decreases. Therefore, when the value of the reactor current IL at a time point of turning OFF the second switching element Q2 is taken as the second command Iref2, charge time increases with the decrease of the reactor current IL in the period β. In this regard, in the second mode, the period α in which the second switching element Q2 is in an ON-state is set in such a way that the value of the reactor current IL will be the second command Iref2 at the time point of turning OFF the first switching element Q1.

Referring to FIG. 12 again, a feedback control unit 53 accepts an input of the third command Iref3. The third command Iref3 has a value larger than the first and second commands Iref1 and Iref2. Further, the feedback control unit 53 acquires an average IL_ave, which is an actual current of the reactor current IL. The average IL_ave is obtained by accumulating the reactor current IL detected by the current detecting means 19 in a predetermined period and averaging the values. An addition unit 54 accepts inputs of the third command Iref3 and the average IL_ave to obtain a difference between the third command Iref3 and the average IL_ave. The difference value outputted from the addition unit 54 is inputted to a PI controller 55 and outputted to a limiter 56. When an output value of the PI controller 55 is larger than a predetermined upper limit, the limiter 56 limits the output value to the upper limit. An adder 57 adds an output value from the limiter 56 to the third command Iref3. As a result, the feedback control unit 53 outputs the third command Iref3 to which the output value of the limiter 56 has been added.

On the other hand, a current correction unit 58 accepts inputs of the input voltage Vin and the capacitive load voltage Vc and outputs a correction value to be added to the third command Iref3. An addition unit 59 adds the correction value outputted from the current correction unit 58 to the third command Iref3 and outputs a third corrected command Iref3' (corrected third command). The correction is made for the following reasons. In the third mode, similar to the second mode, in the period β in which the first switching element Q1 is in an ON-state and the second switching element Q2 is in an OFF-state, decrease of the reactor current IL changes depending on the input voltage Vin and the capacitive load voltage Vc. Therefore, in the third mode, a correction value taking account of the decrease is required to be added. Further, in the third mode, a phenomenon caused by a slope compensation unit 73 (divergence between the third command Iref3 and the average IL_ave) described later is required to be corrected.

A mode selection unit 60 accepts inputs of the first command Iref1, the second corrected command Iref2', and the third corrected command Iref3' that are outputted from the constant current control unit 50. Further, the mode selection unit 60 accepts an input of the capacitive load voltage Vc and compares the capacitive load voltage Vc with the first and second predetermined values V1 and V2. The mode selection unit 60 selects one command to be outputted from among the three candidates of the first command Iref1, the second corrected command Iref2', and the third corrected command Iref3' on the basis of the result of the comparison, and outputs the selected command.

A peak current control unit 70 accepts an input of the command (any one command of the first command Iref1, the second corrected command Iref2', and the third corrected command Iref3') outputted from the mode selection unit 60. A DA converter 71 converts the command inputted from the mode selection unit 60 to an analog value and outputs the converted value to a negative terminal of a comparator 72.

On the other hand, the slope compensation unit 73 generates a slope signal on the basis of a resistor value and inputs the generated slope signal into a DA converter 74. The slope signal is a sawtooth wave signal that linearly and monotonically increases from 0 A in each control cycle. Then, the DA converter 74 converts the inputted slope signal to an analog waveform and outputs the analog waveform to an addition unit 75. The addition unit 75 adds up the inputted reactor current IL and the slope signal after analog conversion, and outputs the added value to a positive terminal of the comparator 72. In the slope compensation unit 73, an analog waveform of the slope signal may be directly generated and the generated slope signal may be outputted to the addition unit 75 without being interposed by the DA converter 74.

The slope compensation unit 73 allows the value of the slope signal to be zero in the first and second modes and outputs a sawtooth wave slope signal in the third mode. The reason why the value of the slope signal is rendered to be zero is as follows. At a time point of turning OFF both of the first and second switching elements Q1 and Q2, the reactor current IL becomes zero in the first and second modes. As a result, a phenomenon of subharmonic oscillation does not occur in the first and second modes.

The comparator 72 compares an input value of the negative terminal with an input value of the positive terminal. The negative terminal of the comparator 72 accepts an input of a command after analog conversion outputted from the DA converter 71 (any one of the first command Iref1, the second corrected command Iref2', and the third corrected command Iref3' after analog conversion). On the other hand, the positive terminal of the comparator 72 accepts an input of the addition value outputted from the adder 75 (value obtained by adding the slope signal after analog conversion to the reactor current IL). Thus, the comparator 72 compares any one of the first command Iref1, the second corrected command Iref2', and the third corrected command Iref3' after analog conversion, with the value obtained by adding the slope signal after analog conversion to the reactor current IL. Then, when the input value of the positive terminal is smaller than the input value of the negative terminal, the comparator 72 outputs a high signal to an S terminal of an RS flip-flop 77. In contrast, when the input value of the positive terminal is larger than the input value of the negative terminal, the comparator 72 outputs a low signal to the S terminal of the RS flip-flop 77. The RS flip-flop 77 has an R terminal that accepts an input of a clock signal from a clock 76.

In the first mode, the RS flip-flop 77 outputs a signal for turning ON one of the first and second switching elements Q1 and Q2 and turning OFF the other switching element, when the input signal is high. In contrast, in the first mode, the RS flip-flop 77 outputs a signal for turning OFF both of the first and second switching elements Q1 and Q2, when the input signal is low.

In the second mode, the RS flip-flop 77 outputs a signal for turning ON both of the first and second switching elements Q1 and Q2, when the input signal is high. In contrast, when the input signal is low in the second mode, the RS flip-flop 77 outputs a signal for turning ON the first switching element Q1 and turning OFF the second switching element Q2 until the Duty value exceeds 50% (in a half of the control cycle). Then, when the Duty value exceeds 50%, the RS flip-flop 77 outputs a signal for turning OFF both of the first and second switching elements Q1 and Q2. When the input signal is low, a process of a Duty limitation unit 78 may take over the control of keeping an ON-state of the first switching element Q1 until the Duty value exceeds 50%.

In the third mode, when the input signal is high, the RS flip-flop 77 outputs a signal for turning ON both of the first and second switching elements Q1 and Q2. In contrast, in the third mode, when the input signal is low, the RS flip-flop 77 outputs a signal for turning ON one of the first and second switching elements Q1 and Q2 and turning OFF the other switching element.

The Duty limitation unit 78 sets an upper limit and a lower limit of the Duty value to the signal outputted from the RS flip-flop 77 and outputs the set signal to the driving circuit 18 that drives the first and second switching elements Q1 and Q2. Specifically, in the first mode, the Duty limitation unit 78 sets an upper limit of the Duty value for each of the first and second switching elements Q1 and Q2 to a value of not more than 50% to prevent overlap of the ON-state period of the in the first switching element Q1 with the ON-state period of the second switching element Q2. In the second mode as well, the Duty limitation unit 78 sets the Duty value of the first switching element Q1 to 50% as described above. Therefore, in the second mode, the Duty limitation unit 78 sets the upper limit so that the Duty value of the second switching element Q2 does not become larger than the Duty value of the first switching element Q1. In the third mode, the Duty limitation unit 78 sets the lower limit of the Duty value for each of the first and second switching elements Q1 and Q2 to a value more than 50% to prevent overlap of the ON-state period of the first switching element Q1 with the ON-state period of the second switching element Q2.

With the above configuration, the power conversion apparatus 7 of the present embodiment exhibits the following advantageous effects in addition to those similar to the first embodiment.

In the power conversion apparatus 7 of the present embodiment, the peak current control unit 70 performs constant current control using the first command Iref1, the second corrected command Iref2', and the third corrected command Iref3' that are inputted from the constant current control unit 50. Thus, in the power conversion apparatus 7 of the present embodiment, robustness against overcurrent can be improved such as when the input voltage Vin alters.

In the power conversion apparatus 7 of the present embodiment, under the peak current control of the second mode, the Duty value of one of the switching elements is fixed and the ON-state period of the other switching element is changed. Therefore, in the power conversion apparatus 7, the peak current control is simplified in comparison with the control under which both of two Duty values corresponding to the respective first and second switching elements Q1 and Q2 are changed. Thus, in the power conversion apparatus 7 of the present embodiment, robustness against overcurrent can be improved.

In the power conversion apparatus 7 of the present embodiment, the fixed Duty value is not more than 50% in the second mode, which leads to making longer the period γ in which both of the first and second switching elements Q1 and Q2 are in an OFF-state. Thus, in the power conversion apparatus 7 of the present embodiment, excitation current passing through the transformer Tr is decreased in the period γ, and magnetic deflection or saturation of the transformer Tr is minimized.

In the power conversion apparatus 7 of the present embodiment, the first and third commands Iref1 and Iref3 are rendered to be divergent values, and the second and third commands Iref2 and Iref3 are rendered to be divergent values. Thus, in the power conversion apparatus 7, the reactor current IL does not become excessive in the first and second modes. Therefore, in the power conversion apparatus 7, when both of the first and second switching elements Q1 and Q2 are turned OFF, the avalanche current is not excessively increased, and thus failure or breakage of the first and second switching elements Q1 and Q2 is minimized. Further, in the power conversion apparatus 7 of the present embodiment, the third command Iref3 is ensured to have a large value in the third mode, and thus the charge time can be shortened.

In the power conversion apparatus 7 of the present embodiment, under the constant current control of the second mode, the second command Iref2 is corrected using the capacitive load voltage Vc and the input voltage Vin to obtain the second corrected command Iref2'. In the power conversion apparatus 7, the second corrected command Iref2' is used for determining an ON-state period of the second switching element Q2. Thus, in the power conversion apparatus 7, when the value of the input voltage Vin is larger than the value obtained by dividing the capacitive load voltage Vc by a turn ratio N, the second corrected command Iref2' becomes smaller than the second command Iref2, and after increase of the reactor current IL in the period β, the second corrected command Iref2' serves as the second command Iref2. Therefore, the power conversion apparatus 7 of the present embodiment minimizes an excessive increase of avalanche current. In contrast, in the power conversion apparatus 7, when the value of the input voltage Vin is smaller than the value obtained by dividing the capacitive load voltage Vc by a turn ratio N, the second corrected command Iref2' becomes larger than the second command Iref2, and after decrease of the reactor current IL in the period β, the second corrected command Iref2' serves as the second command Iref2. Therefore, in the power conversion apparatus 7 of the present embodiment, the reactor current IL is increased in the period α, and thus the charge period can be shortened.

<Modifications>

In the first embodiment, when the second mode is switched to the third mode, the first predetermined value V1 is set in such a way that the output voltage Vout of the transformer Tr is equal to the capacitive load voltage Vc. Alternatively, however, the setting of the first predetermined value V1 may be corrected using a predetermined correction value ΔV1 and the first predetermined value V1 may be set using the following equation (10).

$$V1 = N \times Vin/(2 \times (1-Duty0)) - \Delta V1 \qquad (10)$$

In fact, if there is a difference between the output voltage Vout of the transformer Tr and the capacitive load voltage Vc, high current is not necessarily caused immediately. That is, the difference between the actual output voltage Vout and a theoretical value is caused due to the capacitive load 30, the wiring, the resistance of each coil, the loss of each switching element, the difference between the command of each PWM signal and the actual Duty value, and the like. Therefore, actually, the current value will not become infinite. When the current value is smaller than a current resistance of an element in the circuit, the occurrence is tolerated.

When the control of the third mode is performed, as described above, the charging rate for the capacitive load 30 can be increased. Accordingly, in the present modification, a positive correction value ΔV1 is subtracted from the first predetermined value V1, and the control of the third mode is started earlier. Thus, in comparison with the case of using a theoretical value as the first predetermined value V1, the charging rate for the capacitive load 30 can be increased.

The correction value ΔV1 may be a negative value. In this case, the first predetermined value V1 becomes large and transition from the second mode to the third mode is delayed, and thus the charging rate for the capacitive load 30 is lowered. On the other hand, in this case, the current that is caused due to the difference between the output voltage Vout of the transformer Tr and the capacitive load voltage Vc can be minimized even more. Accordingly, a circuit configuration applying less load on an element in the circuit can be achieved.

In the first embodiment, in performing the control of the third mode, Duty3 is set in such a way that the output voltage Vout of the transformer Tr is equal to the capacitive load voltage Vc. Alternatively, however, Duty3 may be set by correcting the capacitive load voltage Vc using a predetermined correction value ΔVc, as in the following equation (11).

$$Duty3 = 1 - N \times Vin / (2 \times (Vc + \Delta Vc)) \quad (11)$$

As described above, in fact, if there is a difference between the output voltage Vout of the transformer Tr and the capacitive load voltage Vc, high current is not necessarily caused immediately. In this regard, in calculating Duty3 in the present modification, the correction value ΔVc is added to the capacitive load voltage Vc, thereby making Duty3 larger than the theoretical value. Thus, in the present modification, the time of applying the input voltage Vin to the choke coil 11 can be made longer, and the current used for charge can be increased. As a result, the charging rate can be increased more. The correction value ΔVc may be the same value as or may be a different from the correction value ΔV1. The correction value ΔVc may be changed in conformity with the increase of the capacitive load voltage Vc.

The correction value ΔV1 may be a negative value. In this case, the value of Duty3 is decreased and the period α of increasing the current of the choke coil 11 is shortened, and thus the charging rate for the capacitive load 30 is decreased. On the other hand, in this case, the current that is caused due to the difference between the output voltage Vout of the transformer Tr and the capacitive load voltage Vc can be mitigated further, thereby achieving a circuit configuration imposing no load on the an element in the circuit.

In the first embodiment, the first mode is taken as the case where the output voltage Vout is not larger than the second predetermined value V2, the second mode is taken as the case where the output voltage Vout is larger than the second predetermined value V2 but not larger than the first predetermined value V1, and the third mode is taken as the case where the output voltage Vout is larger than the first predetermined value V1. However, the control method by the first, second and third modes is not limited to this. Specifically, the first mode may be taken as the case where the output voltage Vout is smaller than the second predetermined value V2, the second mode may be taken as the case where the output voltage Vout is not smaller than the second predetermined value V2 but smaller than the first predetermined value V1, and the third mode may be taken as the case where the output voltage Vout is not smaller than the first predetermined value V1. This control method is applied to the third embodiment.

In the first embodiment, the control cycles of the first, second and third modes have an equal value. Alternatively, the control cycles may be different from each other in these modes. That is, in each mode, the control cycle of the first PWM signal only has to be equal to the control cycle of the second PWM signal. In the second embodiment, the control cycles of the first and third modes may have a different value. This method of setting control cycle is applied to the third embodiment.

In each embodiment, it is preferable to set the length T1 of an ON-state period in such a way that the choke coil current becomes zero when the period γ of the first mode has expired. However, setting of the length T1 is not necessarily limited to this. When the length T1 of the ON-state period is set in such a way that the choke coil current does not become zero at the expiration of the period γ, the choke coil current gradually increases due to the repetition of the control of the first mode. In this case, the length T1 of the ON-state period may only have to be set in such a way that the gradually increasing choke coil current does not exceed the rated current values of the first and second switching elements Q1 and Q2.

In the first and third embodiments it is preferable to set the lengths T2h and T2l of the ON-state period in such a way that the choke coil current becomes zero at the expiration of the period γ of the second mode. However, setting of the lengths T2h and T2l is not necessarily limited to this. When the lengths T2h and T2l of the ON-state period are set in such a way that the choke coil current does not become zero at the expiration of the period γ, the choke coil current gradually increases due to the repetition of the control of the second mode. In this case, the lengths T2h and T2l of the ON-state period may only have to be set in such a way that the gradually increasing choke coil current does not exceed the rated current values of the first and second switching elements Q1 and Q2.

In each embodiment, it is preferable to set the length T3 of the ON-state period in such a way that the increase of the choke coil current in the period α will be equal to the decrease of the choke coil current in the period β. However, setting of the length T3 is not necessarily limited to this. When the length T3 of the ON-state period is set in such a way that the decrease of the choke coil current in the period β is smaller than the increase of the choke coil current in the period α, the choke coil current gradually increases due to the repetition of the control of the third mode. In this case, the length T3 of the ON-state period may only have to be set in such a way that the gradually increasing choke coil current does not exceed the rated current values of the first and second switching elements Q1 and Q2.

In the first embodiment, in the first mode, one control cycle is defined to be from the time point of turning ON the first switching element Q1 until the time point of turning ON the first switching element Q1 next time. However, the definition of a control cycle is not limited to this. For example, one control cycle may defined to be from a time point of turning OFF the first switching element Q1 until a time point of turning ON the first switching element Q1 next time. The definition of a control cycle is applied to other modes. The definition of a control cycle in the fifth embodiment is not limited to the above example. In the fifth embodiment, for example, in the control of the first mode shown in FIG. 9A, one control cycle may be defined as a control cycle including one period β and one period γ which each correspond to a ¼ control cycle. In this case as well, the time point of starting the control cycle may be the time point of turning OFF the switching element.

The seventh embodiment is configured to correct the second command Iref2. However, the seventh embodiment may be configured not to perform the correction. In this case, the value of the reactor current IL serves as the second command Iref2 at the time point of turning OFF one of the first and second switching elements Q1 and Q2. When such control is performed, the ON-state period of a switching element having a shorter ON-state period may be fixed and the ON-state period of the other switching element may be changed, or the ON-state periods of both of the switching elements may be variable.

similar to the second embodiment, the seventh embodiment may be configured not to perform the control of the second mode.

In each embodiment, the power conversion apparatus is provided to a hybrid vehicle. However, the power conversion apparatus can be applied to objects other than hybrid vehicles. Further, in each embodiment, the DCDC converter 10 is ensured to perform bidirectional supply/reception of power. However, the DCDC converter 10 may be ensured to perform power supply only from the first coil L1 side to the second coil L2 side. In that case, the bridge circuit 14 may be used as a diode bridge circuit.

DESCRIPTION OF REFERENCE SIGNS 1, 3, 7 . . . power conversion apparatus, 10 . . . DCDC converter, 11 . . . choke coil, 12 . . . predetermined connecting point, 13 . . . center tap, 14 . . . bridge circuit, 15 . . . input voltage detecting means, 16 . . . capacitive load voltage detecting means, 17 . . . pulse generation unit, 19 . . . current detecting means, 20 . . . secondary battery, 30 . . . capacitive load, 73 . . . slope compensation unit, 75 . . . addition unit, L1 . . . first coil, L2 . . . second coil, Q1 . . . first switching element, Q2 . . . second switching element.

What is claimed is:

1. A power conversion apparatus, comprising:
a direct current power supply;
a choke coil having an input terminal connected to a positive terminal of the direct current power supply;
a first coil having a center tap, with both ends connected to a predetermined connecting point, one end via a first switching element and the other end via a second switching element;
a second coil magnetically coupled to the first coil;
a capacitive load connected to the second coil via a rectifying circuit;
a capacitive load voltage detecting means detecting a capacitive load voltage as a voltage of the capacitive load; and
a pulse generation unit transmitting one of an ON signal for instructing state transition to ON, and an OFF signal for instructing state transition to OFF, to the first and second switching elements, wherein
the center tap is connected to a negative terminal of the direct current power supply and the predetermined connecting point is connected to an output terminal of the choke coil,
when the capacitive load voltage is not larger than a first predetermined value, a first mode is defined as a control under which a control of turning ON one of the first and second switching elements and turning OFF the other switching element is alternated with a control of turning OFF both the first and second switching elements, and
when the capacitive load voltage is larger than the first predetermined value, a third mode is defined as a control under which a control of turning ON one of the first and second switching elements and turning OFF the other switching element is alternated with a control of turning ON both the first and second switching elements.

2. A power conversion apparatus, comprising:
a direct current power supply;
a choke coil having an input terminal connected to a positive terminal of the direct current power supply;
a first coil having a center tap, with both ends connected to a predetermined connecting point, one end via a first switching element and the other end via a second switching element;
a second coil magnetically coupled to the first coil;
a capacitive load connected to the second coil via a rectifying circuit;
a capacitive load voltage detecting means detecting a capacitive load voltage as a voltage of the capacitive load; and
a pulse generation unit transmitting one of an ON signal for instructing state transition to ON, and an OFF signal for instructing state transition to OFF, to the first and second switching elements, wherein
the center tap is connected to a negative terminal of the direct current power supply and the predetermined connecting point is connected to an output terminal of the choke coil,
when the capacitive load voltage is not larger than a second predetermined value that is a value smaller than a first predetermined value, a first mode is defined as a control under which a control of turning ON one of the first and second switching elements and turning OFF the other switching element is alternated with a control of turning OFF both the first and second switching elements,
when the capacitive load voltage is larger than the second predetermined value but not larger than the first predetermined value, a second mode is defined as a control under which a control of turning ON both the first and second switching elements, a control of turning ON one of the first and second switching elements and turning OFF the other switching element, and a control of turning OFF both the first and second switching elements are sequentially repeated, and
when the capacitive load voltage is larger than the first predetermined value, a third mode is defined as a control under which a control of turning ON one of the first and second switching elements and turning OFF the other switching element is alternated with a control of turning ON both the first and second switching elements.

3. The power conversion apparatus according to claim 1, wherein the pulse generation unit transmits signals having an equal control cycle to the respective first and second switching elements.

4. A power conversion apparatus, comprising:
a direct current power supply;
a choke coil having an input terminal connected to a positive terminal of the direct current power supply;

a first coil having a center tap, with both ends connected to a predetermined connecting point, one end via a first switching element and the other end via a second switching element;

a second coil magnetically coupled to the first coil;

a capacitive load connected to the second coil via a rectifying circuit;

a capacitive load voltage detecting means detecting a capacitive load voltage as a voltage of the capacitive load; and a pulse generation unit transmitting a first PWM signal and a second PWM signal having an equal control cycle and serving as driving signals for the switching elements, the first PWM signal being transmitted to the first switching element, the second PWM signal being transmitted to the second switching element, wherein the center tap is connected to a negative terminal of the direct current power supply and the predetermined connecting point is connected to an output terminal of the choke coil, when the capacitive load voltage is not larger than a first predetermined value, a first mode is defined as a control under which a phase difference between the first and second PWM signals corresponds to a half of the control cycle and Duty values of the first and second PWM signals are an equal of less than 0.5, and when the capacitive load voltage is larger than the first predetermined value, a third mode is defined as a control under which a phase difference between the first and second PWM signals corresponds to a half of the control cycle and Duty values of the first and second PWM signals are an equal of larger than 0.5.

5. A power conversion apparatus, comprising:

a direct current power supply;

a choke coil having an input terminal connected to a positive terminal of the direct current power supply;

a first coil having a center tap, with both ends connected to a predetermined connecting point, one end via a first switching element and the other end via a second switching element;

a second coil magnetically coupled to the first coil;

a capacitive load connected to the second coil via a rectifying circuit;

a capacitive load voltage detecting means detecting a capacitive load voltage as a voltage of the capacitive load; and a pulse generation unit transmitting a first PWM signal and a second PWM signal having an equal control cycle and serving as driving signals for the switching elements, the first PWM signal being transmitted to the first switching element, the second PWM signal being transmitted to the second switching element, wherein the center tap is connected to a negative terminal of the direct current power supply and the predetermined connecting point is connected to an output terminal of the choke coil, when the capacitive load voltage is not larger than a second predetermined value that is smaller than a first predetermined value, a first mode is defined as a control under which a phase difference between the first and second PWM signals corresponds to a half of the control cycle and Duty values of the first and second PWM signals are an equal in value and less than 0.5, when the capacitive load voltage is larger than the second predetermined value but not larger than the first predetermined value, a second mode is defined as a control under which a phase difference between the first and second PWM signals corresponds to on control cycle, the first and second PWM signals are signals where a signal of a first Duty value is alternated with a signal of a second Duty value different from the first Duty value on a control-cycle basis, a result of adding the first Duty value and the second Duty value is smaller than 1, and a time point of switching the signal of the first Duty value from OFF to ON and a time point of switching the signal of the second Duty value from OFF to ON have a difference corresponds to one control cycle, and when the capacitive load voltage is larger than the first predetermined value, a third mode is defined as a control under which a phase difference between the first and second PWM signals corresponds to a half of the control cycle and Duty values of the first and second PWM signals are an equal value lf larger than 0.5.

6. The power conversion apparatus according to claim 4, further comprising an input voltage detecting means detecting an input voltage that is a voltage of the direct current power supply, wherein the first predetermined value is calculated from Formula (1)

$$V1 = N \times Vin/(2 \times (1-Duty0)) \tag{1},$$

where the V1 is the first predetermined value, the N is a turn ratio of the second coil to the first coil, the Vin is an input voltage detected by the input voltage detecting means, and the Duty0 is an initial value of the Duty value in starting control of the third mode, the initial value being more than 0.5 but less than 1.

7. The power conversion apparatus according to claim 4, further comprising an input voltage detecting means detecting an input voltage that is a voltage of the direct current power supply, wherein the Duty value of the third mode when the capacitive load voltage is larger than the first predetermined value is calculated from Formula (2)

$$Duty3 = 1 - N \times Vin/(2 \times Vc) \tag{2}$$

where the Duty3 is the Duty value, the N is a turn ratio of the second coil to the first coil, the Vin is an input voltage detected by the input voltage detecting means, and the Vc is the capacitive load voltage.

8. The power conversion apparatus according to claim 6, wherein the Duty value of the third mode when the capacitive load voltage is larger than the first predetermined value is calculated from Formula (2)

$$Duty3 = 1 - N \times Vin/(2 \times Vc) \tag{2}$$

where the Duty3 is the Duty value, the N is a turn ratio of the second coil to the first coil, the Vin is an input voltage detected by the input voltage detecting means, and the Vc is the capacitive load voltage.

9. The power conversion apparatus according to claim 6, wherein the first predetermined value calculated from Formula (1) is corrected using a predetermined correction value.

10. The power conversion apparatus according to claim 7, wherein, when the Duty value is calculated from Formula (2), the Duty value is calculated by adding a correction value to the capacitive load voltage.

11. The power conversion apparatus according to claim 8, wherein, when the Duty value is calculated from Formula (2), the Duty value is calculated by adding a correction value to the capacitive load voltage.

12. The power conversion apparatus according to claim 4, further comprising an input voltage detecting means detecting an input voltage that is a voltage of the direct current power supply, wherein the Duty value of the first mode is calculated from Formula (3)

$$Duty1 = Imax1 \times L / \{Ts(Vin - Vc/N)\} \quad (3)$$

where the Duty1 is the Duty value, the Imax1 is a maximum allowable value of a current passing through the choke coil, the L is self-inductance of the choke coil, the Ts is the control cycle, the Vin is an input voltage detected by the input voltage detecting means, the Vc is the capacitive load voltage, and the N is a turn ratio of the second coil to the first coil.

13. The power conversion apparatus according to claim 5, further comprising an input voltage detecting means detecting an input voltage that is a voltage of the direct current power supply, wherein
the first Duty value and the second Duty value of the second mode are calculated from Formulas (4) and (5)

$$Duty2l < Imax2 \times L / (Ts \times Vin) \quad (4)$$

$$Duty2h = \{(Imax2 \times L - Vin \times Duty2l \times Ts) / \{Ts(Vin - Vc/N)\}\} + Duty2l \quad (5)$$

where the Duty2l is either one of the first Duty value and the second Duty value and the other is the Duty2h, the Duty2h is a value larger than the Duty2l, the Imax2 is a maximum allowable value of a current passing through the choke coil, the L is self-inductance of the choke coil, the Ts is the control cycle, the Vin is an input voltage detected by the input voltage detecting means, the Vc is the capacitive load voltage, and the N is a turn ratio of the second coil to the first coil.

14. The power conversion apparatus according to claim 3, wherein, under control of the first mode in a first predetermined period, one of the first and second switching elements is turned OFF, and the other switching element is alternately turned ON and OFF.

15. The power conversion apparatus according to claim 14, wherein, under control of the third mode in a second predetermined period, one of the first and second switching elements is turned ON, and the other switching element is alternately turned ON and OFF.

16. The power conversion apparatus according to claim 14, wherein, in a third predetermined period, an accumulated value of time in an ON-state of the first switching element is equal to an accumulated value of time in an ON-state of the second switching element.

17. The power conversion apparatus according to claim 1, wherein, under control of the first mode in a first predetermined period, one of the first and second switching elements is turned OFF, and the other switching element is alternately turned ON and OFF.

18. The power conversion apparatus according to claim 17, wherein, under control of the third mode in a second predetermined period, one of the first and second switching elements is turned ON, and the other switching element is alternately turned ON and OFF.

19. The power conversion apparatus according to claim 18, wherein, in a third predetermined period, an accumulated value of time in an ON-state of the first switching element is equal to an accumulated value of time in an ON-state of the second switching element.

20. The power conversion apparatus according to claim 17, wherein, in a third predetermined period, an accumulated value of time in an ON-state of the first switching element is equal to an accumulated value of time in an ON-state of the second switching element.

21. The power conversion apparatus according to claim 1, wherein, under control of the third mode in a second predetermined period, one of the first and second switching elements is turned ON, and the other switching element is alternately turned ON and OFF.

22. The power conversion apparatus according to claim 21, wherein, in a third predetermined period, an accumulated value of time in an ON-state of the first switching element is equal to an accumulated value of time in an ON-state of the second switching element.

23. The power conversion apparatus according to claim 1, wherein, in a third predetermined period, an accumulated value of time in an ON-state of the first switching element is equal to an accumulated value of time in an ON-state of the second switching element.

24. The power conversion apparatus according to claim 1, further comprising a current detecting means detecting a current value of the choke coil, wherein,
in each of the first and third modes, the first and second switching elements are controlled in such a way that the current value detected by the current detecting means serves as a command current that is a preset value.

25. The power conversion apparatus according to claim 24, wherein
the command current of the third mode is larger than the command current of the first mode.

26. The power conversion apparatus according to claim 24, further comprising:
a slope compensation unit generating a slope signal; and
an addition unit adding the slope signal to the current value, wherein,
in the first mode and a second mode, the slope compensation unit generates the slope signal having a zero value and the addition unit adds the slope signal having a zero value to the current value, and in the third mode, the slope compensation unit generates the slope signal of a sawtooth wave, and the addition unit adds the slope signal of a sawtooth wave to the current value.

27. The power conversion apparatus according to claim 26, wherein, in each of the first, second and third modes, peak current control is performed in such a way that the current value serves as the command current.

28. The power conversion apparatus according to claim 24, wherein, in each of the first, second and third modes, peak current control is performed in such a way that the current value serves as the command current.

29. The power conversion apparatus according to claim 2, further comprising a current detecting means detecting a current value in the choke coil, wherein,
in each of the first, second and third modes, the first and second switching elements are controlled in such a way that the current value detected by the current detecting means serves as a command current that is a preset value.

30. The power conversion apparatus according to claim 29, wherein the command current of the third mode is larger than the command current of the first mode and larger than the command current of the second mode.

31. The power conversion apparatus according to claim 29, wherein, under control of the second mode, an ON-state period of one of the first and second switching elements is fixed and an ON-state period of the other of the first and second switching elements is changed to ensure the current value to serve as the command current.

32. The power conversion apparatus according to claim 31, wherein, in the second mode, the switching element having a fixed ON-state period among the first and second switching elements has a Duty value of not more than 50%.

33. The power conversion apparatus according to claim 29, wherein, under control of the second mode, the current value at a time point of turning OFF both of the first and second switching elements is ensured to serve as the command current.

34. The power conversion apparatus according to claim 33, further comprising:
a slope compensation unit generating a slope signal; and
an addition unit adding the slope signal to the current value, wherein,
in the first mode and a second mode, the slope compensation unit generates the slope signal having a zero value and the addition unit adds the slope signal having a zero value to the current value, and in the third mode, the slope compensation unit generates the slope signal of a sawtooth wave and the addition unit adds the slope signal of a sawtooth wave to the current value.

35. The power conversion apparatus according to claim 29, wherein, in each of the first, second and third modes, peak current control is performed in such a way that the current value serves as the command current.

36. The power conversion apparatus according to claim 31, wherein, under control of the second mode, the current value at a time point of turning OFF both of the first and second switching elements is ensured to serve as the command current.

37. The power conversion apparatus according to claim 36, further comprising:
a slope compensation unit generating a slope signal; and
an addition unit adding the slope signal to the current value, wherein,
in the first mode and a second mode, the slope compensation unit generates the slope signal having a zero value and the addition unit adds the slope signal having a zero value to the current value, and in the third mode, the slope compensation unit generates the slope signal of a sawtooth wave and the addition unit adds the slope signal of a sawtooth wave to the current value.

38. The power conversion apparatus according to claim 36, wherein, in each of the first, second and third modes, peak current control is performed in such a way that the current value serves as the command current.

39. The power conversion apparatus according to claim 31, further comprising:
a slope compensation unit generating a slope signal; and
an addition unit adding the slope signal to the current value, wherein,
in the first mode and a second mode, the slope compensation unit generates the slope signal having a zero value and the addition unit adds the slope signal having a zero value to the current value, and in the third mode, the slope compensation unit generates the slope signal of a sawtooth wave and the addition unit adds the slope signal of a sawtooth wave to the current value.

40. The power conversion apparatus according to claim 39, wherein, in each of the first, second and third modes, peak current control is performed in such a way that the current value serves as the command current.

41. The power conversion apparatus according to claim 31, wherein, in each of the first, second and third modes, peak current control is performed in such a way that the current value serves as the command current.

42. The power conversion apparatus according to claim 29, further comprising:
a slope compensation unit generating a slope signal; and
an addition unit adding the slope signal to the current value, wherein,
in the first mode and a second mode, the slope compensation unit generates the slope signal having a zero value and the addition unit adds the slope signal having a zero value to the current value, and in the third mode, the slope compensation unit generates the slope signal of a sawtooth wave and the addition unit adds the slope signal of a sawtooth wave to the current value.

43. The power conversion apparatus according to claim 42, wherein, in each of the first, second and third modes, peak current control is performed in such a way that the current value serves as the command current.

44. The power conversion apparatus according to claim 32, further comprising:
a slope compensation unit generating a slope signal; and
an addition unit adding the slope signal to the current value, wherein,
in the first mode and a second mode, the slope compensation unit generates the slope signal having a zero value and the addition unit adds the slope signal having a zero value to the current value, and in the third mode, the slope compensation unit generates the slope signal of a sawtooth wave and the addition unit adds the slope signal of a sawtooth wave to the current value.

45. The power conversion apparatus according to claim 44, wherein, in each of the first, second and third modes, peak current control is performed in such a way that the current value serves as the command current.

46. The power conversion apparatus according to claim 32, wherein, in each of the first, second and third modes, peak current control is performed in such a way that the current value serves as the command current.

47. A power conversion apparatus, comprising:
a direct current power supply;
a choke coil having an input terminal connected to a positive terminal of the direct current power supply;
a first coil having a center tap, with both ends connected to a predetermined connecting point, one end via a first switching element and the other end via a second switching element;
a second coil magnetically coupled to the first coil;
a capacitive load connected to the second coil via a rectifying circuit;
a capacitive load voltage detecting means detecting a capacitive load voltage as a voltage of the capacitive load; and
a pulse generation unit transmitting one of an ON signal for instructing state transition to ON, and an OFF signal for instructing state transition to OFF, to the first and second switching elements, wherein
the center tap is connected to an output terminal of the choke coil and the predetermined connecting point is connected to a negative terminal of the direct current power supply,
when the capacitive load voltage is not larger than a first predetermined value or less, a first mode is defined as a control under which a control of turning ON one of the first and second switching elements and turning OFF the other switching element is alternated with a control of turning OFF both of the first and second switching elements, and
when the capacitive load voltage is larger than the first predetermined value, a third mode is defined as a control under which a control of turning ON one of the first and second switching elements and turning OFF the other switching element is alternated with a control of turning ON both of the first and second switching elements.

48. A power conversion apparatus, comprising:
a direct current power supply;
a choke coil having an input terminal connected to a positive terminal of the direct current power supply;
a first coil having a center tap, with both ends connected to a predetermined connecting point, one end via a first switching element and the other end via a second switching element;
a second coil magnetically coupled to the first coil;
a capacitive load connected to the second coil via a rectifying circuit;
a capacitive load voltage detecting means detecting a capacitive load voltage as a voltage of the capacitive load; and
a pulse generation unit transmitting one of an ON signal for instructing state transition to ON, and an OFF signal for instructing state transition to OFF, to the first and second switching elements, wherein
the center tap is connected to an output terminal of the choke coil and the predetermined connecting point is connected to a negative terminal of the direct current power supply,
when the capacitive load voltage is not larger than a second predetermined value that is smaller than a first predetermined value, a first mode is defined as a control under which a control of turning ON one of the first and second switching elements and turning OFF the other switching element is alternated with a control of turning OFF both of the first and second switching elements,
when the capacitive load voltage is larger than the second predetermined value but not larger than the first predetermined value, a second mode is defined as a control under which a control of turning ON both of the first and second switching elements, a control of turning ON one of the first and second switching elements and turning OFF the other switching element, and a control of turning OFF both of the first and second switching elements are sequentially repeated, and
when the capacitive load voltage is larger than the first predetermined value, a third mode is defined as a control under which a control of turning ON one of the first and second switching elements and turning OFF the other switching element is alternated with a control of turning ON both of the first and second switching elements.

49. The power conversion apparatus according to claim 47, wherein the pulse generation unit transmits signals having an equal control cycle to the respective first and second switching elements.

50. A power conversion apparatus, comprising:
a direct current power supply;
a choke coil having an input terminal connected to a positive terminal of the direct current power supply;
a first coil having a center tap, with both ends connected to a predetermined connecting point, one end via a first switching element and the other end via a second switching element;
a second coil magnetically coupled to the first coil;
a capacitive load connected to the second coil via a rectifying circuit;
a capacitive load voltage detecting means detecting a capacitive load voltage as a voltage of the capacitive load; and
a pulse generation unit transmitting a first PWM signal and a second PWM signal having an equal control cycle and serving as driving signals for the switching elements, the first PWM signal being transmitted to the first switching element, the second PWM signal being transmitted to the second switching element, wherein
the center tap is connected to an output terminal of the choke coil and the predetermined connecting point is connected to a negative terminal of the direct current power supply,
when the capacitive load voltage is not larger than a first predetermined value, a first mode is defined as a control under which a phase difference between the first and second PWM signals corresponds to a half of the control cycle and Duty values of the first and second PWM signals are an equal in value and less than 0.5, and
when the capacitive load voltage is larger than the first predetermined value, a third mode is defined as a control under which a phase difference between the first and second PWM signals corresponds to a half of the control cycle and Duty values of the first and second PWM signals are an equal value larger than 0.5.

51. A power conversion apparatus, comprising:
a direct current power supply;
a choke coil having an input terminal connected to a positive terminal of the direct current power supply;
a first coil having a center tap, with both ends connected to a predetermined connecting point, one end via a first switching element and the other end via a second switching element;
a second coil magnetically coupled to the first coil;
a capacitive load connected to the second coil via a rectifying circuit;
a capacitive load voltage detecting means detecting a capacitive load voltage as a voltage of the capacitive load; and
a pulse generation unit transmitting a first PWM signal and a second PWM signal having an equal control cycle and serving as driving signals for the switching elements, the first PWM signal being transmitted to the first switching element, the second PWM signal being transmitted to the second switching element, wherein
the center tap is connected to an output terminal of the choke coil and the predetermined connecting point is connected to a negative terminal of the direct current power supply,
when the capacitive load voltage is not larger than a second predetermined value that is smaller than a first predetermined value, a first mode is defined as a control under which a phase difference between the first and second PWM signals corresponds to a half of the control cycle and Duty values of the first and second PWM signals are an equal in value and less than 0.5,
when the capacitive load voltage is larger than the second predetermined value but not larger than the first predetermined value, a second mode is defined as a control under which a phase difference between the first and second PWM signals corresponds to one control cycle, the first and second PWM signals are signals where a signal of a first Duty value is alternated with a signal of a second Duty value different from the first Duty value on a control-cycle basis, a result of adding the first Duty value and the second Duty value is less than 1, and a time point of switching the signal of the first Duty value from OFF to ON and a time point of switching the signal of the second Duty value from OFF to ON have a difference corresponding to one cycle of the control cycle, and when the capacitive load voltage is larger than the first predetermined value, a third mode is defined as a control under which a phase difference between the first and second PWM signals corresponds to a half of the control cycle and Duty values of the first and second PWM signals are an equal in value and more than 0.5.

52. The power conversion apparatus according to claim 50, further comprising an input voltage detecting means detecting an input voltage that is a voltage of the direct current power supply, wherein the first predetermined value is calculated from Formula (1)

$$V1 = N \times Vin/(2 \times (1-Duty0)) \quad (1),$$

where the V1 is the first predetermined value, the N is a turn ratio of the second coil to the first coil, the Vin is an input voltage detected by the input voltage detecting means, and the Duty0 is an initial value of the Duty value in starting control of the third mode, the initial value being more than 0.5 but less than 1.

53. The power conversion apparatus according to claim 50, further comprising an input voltage detecting means detecting an input voltage that is a voltage of the direct current power supply, wherein the Duty value of the third mode when the capacitive load voltage is larger than the first predetermined value is calculated from Formula (2)

$$Duty3 = 1 - N \times Vin/(2 \times Vc) \quad (2)$$

where the Duty3 is the Duty value, the N is a turn ratio of the second coil to the first coil, the Vin is an input voltage detected by the input voltage detecting means, and the Vc is the capacitive load voltage.

54. The power conversion apparatus according to claim 52, wherein the Duty value of the third mode when the capacitive load voltage is larger than the first predetermined value is calculated from Formula (2)

$$Duty3 = 1 - N \times Vin/(2 \times Vc) \quad (2)$$

where the Duty3 is the Duty value, the N is a turn ratio of the second coil to the first coil, the Vin is an input voltage detected by the input voltage detecting means, and the Vc is the capacitive load voltage.

55. The power conversion apparatus according to claim 52, wherein the first predetermined value calculated from Formula (1) is corrected using a predetermined correction value.

56. The power conversion apparatus according to claim 53, wherein, in calculating the Duty value from Formula (2), a correction value is added to the capacitive load voltage.

57. The power conversion apparatus according to claim 54, wherein, in calculating the Duty value from Formula (2), a correction value is added to the capacitive load voltage.

58. The power conversion apparatus according to claim 50, further comprising an input voltage detecting means detecting an input voltage that is a voltage of the direct current power supply, wherein the Duty value of the first mode is calculated from Formula (3)

$$Duty1 = Imax1 \times L/\{Ts(Vin-Vc/N)\} \quad (3)$$

where the Duty1 is the Duty value, the Imax1 is a maximum allowable value of a current passing through the choke coil, the L is self-inductance of the choke coil, the Ts is the control cycle, the Vin is an input voltage detected by the input voltage detecting means, the Vc is the capacitive load voltage, and the N is a turn ratio of the second coil to the first coil.

59. The power conversion apparatus according to claim 51, further comprising an input voltage detecting means detecting an input voltage that is a voltage of the direct current power supply, wherein the first Duty value and the second Duty value of the second mode are calculated from Formulas (4) and (5)

$$Duty2l < Imax2 \times L/(Ts \times Vin) \quad (4)$$

$$Duty2h = \{(Imax2 \times L - Vin \times Duty2l \times Ts)/\{Ts(Vin-Vc/N)\}\} + Duty2l \quad (5)$$

where the Duty2l is either one of the first Duty value and the second Duty value, and the other Duty value is the Duty2h, the Duty2h is more than the Duty2l, the Imax2 is a maximum allowable value of a current passing through the choke coil, the L is self-inductance of the choke coil, the Ts is the control cycle, the Vin is an input voltage detected by the input voltage detecting means, the Vc is the capacitive load voltage, and the N is a turn ratio of the second coil to the first coil.

60. The power conversion apparatus according to claim 49, wherein, under control of the first mode in a first predetermined period, one of the first and second switching elements is turned OFF, and the other switching element is alternately turned ON and OFF.

61. The power conversion apparatus according to claim 60, wherein, under control of the third mode in a second predetermined period, one of the first and second switching elements is turned ON, and the other switching element is alternately turned ON and OFF.

62. The power conversion apparatus according to claim 60, wherein, in a third predetermined period, an accumulated value of time in an ON-state of the first switching element is equal to an accumulated value of time in an ON-state of the second switching element.

63. The power conversion apparatus according to claim 47, wherein, under control of the first mode in a first predetermined period, one of the first and second switching elements is turned OFF, and the other switching element is alternately turned ON and OFF.

64. The power conversion apparatus according to claim 63, wherein, under control of the third mode in a second predetermined period, one of the first and second switching elements is turned ON, and the other switching element is alternately turned ON and OFF.

65. The power conversion apparatus according to claim 64, wherein, in a third predetermined period, an accumulated value of time in an ON-state of the first switching element is equal to an accumulated value of time in an ON-state of the second switching element.

66. The power conversion apparatus according to claim 63, wherein, in a third predetermined period, an accumulated value of time in an ON-state of the first switching element is equal to an accumulated value of time in an ON-state of the second switching element.

67. The power conversion apparatus according to claim 47, wherein, under control of the third mode in a second predetermined period, one of the first and second switching elements is turned ON, and the other switching element is alternately turned ON and OFF.

68. The power conversion apparatus according to claim 67, wherein, in a third predetermined period, an accumulated value of time in an ON-state of the first switching element is equal to an accumulated value of time in an ON-state of the second switching element.

69. The power conversion apparatus according to claim 47, wherein, in a third predetermined period, an accumulated value of time in an ON-state of the first switching element is equal to an accumulated value of time in an ON-state of the second switching element.

70. The power conversion apparatus according to claim 47, further comprising a current detecting means detecting a current value of the choke coil, wherein,
in each of the first and third modes, the first and second switching elements are controlled in such a way that the current value detected by the current detecting means serves as a command current that is a preset value.

71. The power conversion apparatus according to claim 70, wherein the command current of the third mode is larger than the command current of the first mode.

72. The power conversion apparatus according to claim 70, further comprising:
a slope compensation unit generating a slope signal; and
an addition unit adding the slope signal to the current value, wherein,
in the first mode and a second mode, the slope compensation unit generates the slope signal having a zero value and the addition unit adds the slope signal having a zero value to the current value, and in the third mode, the slope compensation unit generates the slope signal of a sawtooth wave, and the addition unit adds the slope signal of a sawtooth wave to the current value.

73. The power conversion apparatus according to claim 72, wherein, in each of the first, second and third modes, peak current control is performed in such a way that the current value serves as the command current.

74. The power conversion apparatus according to claim 70, wherein, in each of the first, second and third modes, peak current control is performed in such a way that the current value serves as the command current.

75. The power conversion apparatus according to claim 48, further comprising a current detecting means detecting a current value in the choke coil, wherein,
in each of the first, second and third modes, the first and second switching elements are controlled in such a way that the current value detected by the current detecting means serves as a command current that is a preset value.

76. The power conversion apparatus according to claim 75, wherein the command current of the third mode is larger than the command current of the first mode and larger than the command current of the second mode.

77. The power conversion apparatus according to claim 75, wherein, under control of the second mode, an ON-state period of one of the first and second switching elements is fixed and an ON-state period of the other of the first and second switching elements is changed to ensure the current value to serve as the command current.

78. The power conversion apparatus according to claim 77, wherein, in the second mode, the switching element having a fixed ON-state period among the first and second switching elements has a Duty value of not more than 50%.

79. The power conversion apparatus according to claim 75, wherein, under control of the second mode, the current value at a time point of turning OFF both of the first and second switching elements is ensured to serve as the command current.

80. The power conversion apparatus according to claim 79, further comprising:
a slope compensation unit generating a slope signal; and
an addition unit adding the slope signal to the current value, wherein,
in the first mode and a second mode, the slope compensation unit generates the slope signal having a zero value and the addition unit adds the slope signal having a zero value to the current value, and in the third mode, the slope compensation unit generates the slope signal of a sawtooth wave and the addition unit adds the slope signal of a sawtooth wave to the current value.

81. The power conversion apparatus according to claim 75, wherein, in each of the first, second and third modes, peak current control is performed in such a way that the current value serves as the command current.

82. The power conversion apparatus according to claim 77, wherein, under control of the second mode, the current value at a time point of turning OFF both of the first and second switching elements is ensured to serve as the command current.

83. The power conversion apparatus according to claim 82, further comprising:
a slope compensation unit generating a slope signal; and
an addition unit adding the slope signal to the current value, wherein,
in the first mode and a second mode, the slope compensation unit generates the slope signal having a zero value and the addition unit adds the slope signal having a zero value to the current value, and in the third mode, the slope compensation unit generates the slope signal of a sawtooth wave and the addition unit adds the slope signal of a sawtooth wave to the current value.

84. The power conversion apparatus according to claim 82, wherein, in each of the first, second and third modes, peak current control is performed in such a way that the current value serves as the command current.

85. The power conversion apparatus according to claim 77, further comprising:
a slope compensation unit generating a slope signal; and
an addition unit adding the slope signal to the current value, wherein,
in the first mode and a second mode, the slope compensation unit generates the slope signal having a zero value and the addition unit adds the slope signal having a zero value to the current value, and in the third mode, the slope compensation unit generates the slope signal of a sawtooth wave and the addition unit adds the slope signal of a sawtooth wave to the current value.

86. The power conversion apparatus according to claim 85, wherein, in each of the first, second and third modes, peak current control is performed in such a way that the current value serves as the command current.

87. The power conversion apparatus according to claim 77, wherein, in each of the first, second and third modes, peak current control is performed in such a way that the current value serves as the command current.

88. The power conversion apparatus according to claim 75, further comprising:
a slope compensation unit generating a slope signal; and
an addition unit adding the slope signal to the current value, wherein,
in the first mode and a second mode, the slope compensation unit generates the slope signal having a zero value and the addition unit adds the slope signal having a zero value to the current value, and in the third mode, the slope compensation unit generates the slope signal of a sawtooth wave and the addition unit adds the slope
signal of a sawtooth wave to the current value.

89. The power conversion apparatus according to claim 88, wherein, in each of the first, second and third modes, peak current control is performed in such a way that the current value serves as the command current.

90. The power conversion apparatus according to claim 78, further comprising:
a slope compensation unit generating a slope signal; and
an addition unit adding the slope signal to the current value, wherein,
in the first mode and a second mode, the slope compensation unit generates the slope signal having a zero value and the addition unit adds the slope signal having a zero value to the current value, and in the third mode, the slope compensation unit generates the slope signal of a sawtooth wave and the addition unit adds the slope signal of a sawtooth wave to the current value.

91. The power conversion apparatus according to claim 90, wherein, in each of the first, second and third modes, peak current control is performed in such a way that the current value serves as the command current.

92. The power conversion apparatus according to claim 78, wherein, in each of the first, second and third modes, peak current control is performed in such a way that the current value serves as the command current.

93. A method for controlling a power conversion apparatus, the power conversion apparatus including:
a direct current power supply;
a choke coil having an input terminal connected to a positive terminal of the direct current power supply;
a first coil having a center tap, with both ends connected to a predetermined connecting point, one end via a first switching element and the other end via a second switching element;
a second coil magnetically coupled to the first coil;
a capacitive load connected to the second coil via a rectifying circuit;
a capacitive load voltage detecting means detecting a capacitive load voltage as a voltage of the capacitive load; and
a pulse generation unit transmitting one of an ON signal for instructing state transition to ON, and an OFF signal for instructing state transition to OFF, to the first and second switching elements, wherein
the center tap is connected to a negative terminal of the direct current power supply and the predetermined connecting point is connected to an output terminal of the choke coil, the method comprising:
a step of control in a first mode under which, when the capacitive load voltage is not larger than a first predetermined value, a control of turning ON one of the first and second switching elements and turning OFF the other switching element is alternated with a control of turning OFF both of the first and second switching elements; and
a step of control in a third mode under which, when the capacitive load voltage is larger than the first predetermined value, a control of turning ON one of the first and second switching elements and turning OFF the other switching element is alternated with a control of turning ON both of the first and second switching elements.

94. A method for controlling a power conversion apparatus, the power conversion apparatus including
a direct current power supply;
a choke coil having an input terminal connected to a positive terminal of the direct current power supply;
a first coil having a center tap, with both ends connected to a predetermined connecting point, one end via a first switching element and the other end via a second switching element;
a second coil magnetically coupled to the first coil;
a capacitive load connected to the second coil via a rectifying circuit;
a capacitive load voltage detecting means detecting a capacitive load voltage as a voltage of the capacitive load; and
a pulse generation unit transmitting one of an ON signal for instructing state transition to ON, and an OFF signal for instructing state transition to OFF, to the first and second switching elements, wherein
the center tap is connected to a negative terminal of the direct current power supply and the predetermined connecting point is connected to an output terminal of the choke coil, the method comprising:
a step of control in a first mode under which, when the capacitive load voltage is not larger than a second predetermined value that is smaller than a first predetermined value, a control of turning ON one of the first and second switching elements and turning OFF the other switching element is alternated with a control of turning OFF both of the first and second switching elements,
a step of control in a second mode under which, when the capacitive load voltage is larger than the second predetermined value but not larger than the first predetermined value, a control of turning ON both of the first and second switching elements, a control of turning ON one of the first and second switching elements and turning OFF the other switching element, and a control of turning OFF both of the first and second switching elements are sequentially repeated; and
a step of control in a third mode under which, when the capacitive load voltage is larger than the first predetermined value, a control of turning ON one of the first and second switching elements and turning OFF the other switching element is alternated with a control of turning ON both of the first and second switching elements.

95. A method for controlling a power conversion apparatus, the power conversion apparatus including
a direct current power supply;
a choke coil having an input terminal connected to a positive terminal of the direct current power supply;
a first coil having a center tap, with both ends connected to a predetermined connecting point, one end via a first switching element and the other end via a second switching element;
a second coil magnetically coupled to the first coil;
a capacitive load connected to the second coil via a rectifying circuit;
a capacitive load voltage detecting means detecting a capacitive load voltage as a voltage of the capacitive load; and
a pulse generation unit transmitting a first PWM signal and a second PWM signal having an equal control cycle and serving as driving signals for the switching elements, the first PWM signal being transmitted to the first switching element, the second PWM signal being transmitted to the second switching element, wherein the center tap is connected to a negative terminal of the direct current power supply and the predetermined connecting point is connected to an output terminal of the choke coil, the method comprising:

a step of control in a first mode under which, when the capacitive load voltage is not larger than a first predetermined value, a phase difference between the first and second PWM signals corresponds to a half of the control cycle and Duty values of the first and second PWM signals are an equal in value and less than 0.5; and a step of control in a third mode under which, when the capacitive load voltage is larger than the first predetermined value, a phase difference between the first and second PWM signals corresponds to a half of the control cycle and Duty values of the first and second PWM signals are an equal in value and more than 0.5.

96. A method for controlling a power conversion apparatus, the power conversion apparatus including a direct current power supply;

a choke coil having an input terminal connected to a positive terminal of the direct current power supply;

a first coil having a center tap, with both ends connected to a predetermined connecting point, one end via a first switching element and the other end via a second switching element;

a second coil magnetically coupled to the first coil;

a capacitive load connected to the second coil via a rectifying circuit;

a capacitive load voltage detecting means detecting a capacitive load voltage as a voltage of the capacitive load; and a pulse generation unit transmitting a first PWM signal and a second PWM signal having an equal control cycle and serving as driving signals for the switching elements, the first PWM signal being transmitted to the first switching element, the second PWM signal being transmitted to the second switching element, wherein the center tap is connected to a negative terminal of the direct current power supply and the predetermined connecting point is connected to an output terminal of the choke coil, the method comprising:

a step of control in a first mode under which, when the capacitive load voltage is not larger than a second predetermined value that is smaller than a first predetermined value, a phase difference between the first and second PWM signals corresponds to a half of the control cycle and Duty values of the first and second PWM signals are an equal in value and less than 0.5, a step of control in a second mode under which, when the capacitive load voltage is larger than the second predetermined value but not larger than the first predetermined value, a phase difference between the first and second PWM signals corresponds to one control cycle, the first and second PWM signals are signals where a signal of a first Duty value is alternated with a signal of a second Duty value different from the first Duty value on a control-cycle basis, a result of adding the first Duty value and the second Duty value is less than 1, and a time point of switching the signal of the first Duty value from OFF to ON and a time point of switching the signal of the second Duty value from OFF to ON have a difference corresponding to one control cycle; and a step of control in a third mode under which, when the capacitive load voltage is larger than the first predetermined value, a phase difference between the first and second PWM signals corresponds to a half of the control cycle and Duty values of the first and second PWM signals are an equal in value and more than 0.5.

* * * * *